(12) United States Patent
Ching

(10) Patent No.: US 11,017,097 B2
(45) Date of Patent: *May 25, 2021

(54) SYSTEMS AND METHODS FOR PREVENTION OF UNAUTHORIZED ACCESS TO RESOURCES OF AN INFORMATION SYSTEM

(71) Applicant: Peter N. Ching, Cowan Heights, CA (US)

(72) Inventor: Peter N. Ching, Cowan Heights, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/928,359

(22) Filed: Mar. 22, 2018

(65) Prior Publication Data

US 2018/0314841 A1 Nov. 1, 2018

Related U.S. Application Data

(63) Continuation-in-part of application No. 15/692,349, filed on Aug. 31, 2017, now abandoned, which is a
(Continued)

(51) Int. Cl.
*H04L 29/06* (2006.01)
*G06F 21/60* (2013.01)
(Continued)

(52) U.S. Cl.
CPC ............ *G06F 21/602* (2013.01); *G06F 21/32* (2013.01); *G06K 9/00013* (2013.01);
(Continued)

(58) Field of Classification Search
CPC .................................................. G06F 21/602
See application file for complete search history.

(56) References Cited

U.S. PATENT DOCUMENTS 3,949,363 A 4/1976 Holm
4,005,530 A 2/1977 Takahashi et al.
(Continued)

FOREIGN PATENT DOCUMENTS

JP S59194261 11/1984
JP 2008242665 10/2008
WO WO 98/56589 12/1998

OTHER PUBLICATIONS

International Search Report and Written Opinion for Application No. PCT/US2005/017144, dated Jan. 31, 2007, 5 pages.
(Continued)

*Primary Examiner* — Shawnchoy Rahman
(74) *Attorney, Agent, or Firm* — Knobbe, Martens, Olson & Bear, LLP

(57) ABSTRACT

An information security system prevents unauthorized access to resources of an information system. The information security system includes a fingerprint scanner that provides fingerprint data, a radio transceiver that stores encrypted data including fingerprint data from authorized users in a first portion and second data in a second portion, and a hub device that receives the encrypted data and the fingerprint data associated with the scanned fingerprint of a user, decrypts the first portion of the encrypted data to provide decrypted fingerprint data, compares the decrypted fingerprint data with the fingerprint data associated with the scanned fingerprint of the user, identifies the user as an authorized user when the decrypted fingerprint data matches the fingerprint data associated with the scanned fingerprint of the user, and provides the second data to the third party device via the second data interface when the user is identified as the authorized user.

6 Claims, 19 Drawing Sheets

Related U.S. Application Data continuation of application No. 14/512,198, filed on Oct. 10, 2014, which is a continuation of application No. 12/903,107, filed on Oct. 12, 2010, now Pat. No. 8,862,518, which is a continuation of application No. 11/129,538, filed on May 13, 2005, now Pat. No. 7,814,024.

(60) Provisional application No. 60/571,112, filed on May 14, 2004.

(51) Int. Cl.
  G06K 9/00  (2006.01)
  G06K 9/22  (2006.01)
  G06K 9/62  (2006.01)
  G06F 21/32  (2013.01)
  H04M 1/02  (2006.01)
  H04M 3/38  (2006.01)

(52) U.S. Cl.
  CPC ........... *G06K 9/00087* (2013.01); *G06K 9/22* (2013.01); *G06K 9/6215* (2013.01); *H04M 1/0202* (2013.01); *H04M 3/38* (2013.01); *H04M 2203/6054* (2013.01)

(56) References Cited

U.S. PATENT DOCUMENTS

| | | | |
|---|---|---|---|
| 4,114,027 A | 9/1978 | Slater et al. | |
| 4,211,919 A | 7/1980 | Ugon | |
| 4,251,798 A | 2/1981 | Swartz et al. | |
| 4,360,798 A | 11/1982 | Swartz et al. | |
| 4,369,361 A | 6/1983 | Swartz et al. | |
| 4,387,297 A | 6/1983 | Swartz et al. | |
| 4,409,470 A | 10/1983 | Shepard et al. | |
| 4,460,120 A | 7/1984 | Shepard et al. | |
| 4,701,601 A | 10/1987 | Francini et al. | |
| 4,970,655 A | 11/1990 | Winn et al. | |
| 5,202,552 A | 4/1993 | Little et al. | |
| 5,304,786 A | 4/1994 | Pavlidis et al. | |
| 5,319,181 A | 6/1994 | Shellhammer et al. | |
| 5,331,176 A | 7/1994 | Anselmo et al. | |
| 5,481,098 A | 2/1996 | Davis et al. | |
| 5,581,630 A | 12/1996 | Bonneau, Jr. | |
| 5,591,956 A | 1/1997 | Longacre, Jr. et al. | |
| 5,613,783 A | 3/1997 | Kinney et al. | |
| 5,699,528 A | 12/1997 | Hogan | |
| 5,737,418 A * | 4/1998 | Saffari | G07D 7/20 194/205 |
| 5,739,512 A | 4/1998 | Tognazzini | |
| 5,773,806 A | 6/1998 | Longacre, Jr. | |
| 5,797,002 A | 8/1998 | Patterson, Jr. et al. | |
| 5,870,473 A | 2/1999 | Boesch et al. | |
| 5,884,271 A | 3/1999 | Pitroda | |
| 5,889,888 A | 3/1999 | Marianetti, II et al. | |
| 5,953,419 A | 3/1999 | Marianetti, II et al. | |
| 5,956,404 A | 9/1999 | Schneier et al. | |
| 5,978,774 A | 11/1999 | Rogers et al. | |
| 6,073,118 A | 6/2000 | Gormish et al. | |
| 6,116,505 A * | 9/2000 | Withrow | G06Q 20/342 235/375 |
| 6,164,529 A | 12/2000 | Peters et al. | |
| 6,219,652 B1 | 4/2001 | Carter et al. | |
| 6,219,793 B1 * | 4/2001 | Li | G07C 9/37 726/19 |
| 6,247,645 B1 | 6/2001 | Harris et al. | |
| 6,269,348 B1 | 7/2001 | Pare, Jr. et al. | |
| 6,305,604 B1 | 10/2001 | Ono | |
| 6,310,966 B1 | 10/2001 | Dulude et al. | |
| 6,394,341 B1 | 5/2002 | Makipaa et al. | |
| 6,446,092 B1 | 9/2002 | Sutter | |
| 6,490,443 B1 * | 12/2002 | Freeny, Jr. | G07B 15/00 455/406 |
| 6,493,464 B1 | 12/2002 | Hawkins et al. | |
| 6,516,996 B1 | 2/2003 | Hippelainen | |
| 6,533,168 B1 | 3/2003 | Ching | |
| 6,567,915 B1 | 5/2003 | Guthery | |
| 6,611,255 B2 | 8/2003 | Griffin et al. | |
| 6,615,194 B1 | 9/2003 | Deutsch et al. | |
| 6,698,013 B1 | 2/2004 | Betero et al. | |
| 6,701,192 B1 | 3/2004 | Herwig | |
| 6,707,421 B1 | 3/2004 | Drury et al. | |
| 6,775,670 B2 | 8/2004 | Bessette | |
| 6,816,628 B1 | 11/2004 | Sarachik et al. | |
| 6,826,535 B2 | 11/2004 | Wood et al. | |
| 7,304,261 B2 | 12/2007 | Avant et al. | |
| 7,580,613 B2 | 8/2009 | Kato et al. | |
| 8,775,805 B2 | 7/2014 | von Mueller et al. | |
| 9,424,547 B2 * | 8/2016 | Gazdzinski | G06Q 10/0832 |
| 9,633,351 B2 | 4/2017 | Reed | |
| 2001/0025341 A1 | 9/2001 | Marshall | |
| 2002/0103717 A1 | 8/2002 | Swart et al. | |
| 2002/0184527 A1 | 12/2002 | Chun et al. | |
| 2002/0188831 A1 | 12/2002 | Jackson et al. | |
| 2003/0036918 A1 * | 2/2003 | Pintsov | G06Q 20/04 705/1.1 |
| 2003/0053665 A1 * | 3/2003 | Hamid | G06K 9/00087 382/124 |
| 2003/0055792 A1 | 3/2003 | Kinoshita et al. | |
| 2003/0119487 A1 * | 6/2003 | Silvester | H04M 1/6505 455/412.1 |
| 2003/0177102 A1 * | 9/2003 | Robinson | G07C 9/257 705/75 |
| 2003/0220095 A1 * | 11/2003 | Engelhart | G06Q 20/0855 455/410 |
| 2004/0030645 A1 * | 2/2004 | Monaghan | G06Q 20/02 705/40 |
| 2004/0044627 A1 * | 3/2004 | Russell | G06Q 20/00 705/50 |
| 2004/0140735 A1 | 7/2004 | Scott et al. | |
| 2004/0153456 A1 | 8/2004 | Charnock et al. | |
| 2004/0192438 A1 | 9/2004 | Wells et al. | |
| 2004/0236694 A1 | 11/2004 | Tattan | |
| 2004/0243496 A1 * | 12/2004 | Kim | G06Q 20/04 705/35 |
| 2004/0267618 A1 | 12/2004 | Judicibus et al. | |
| 2005/0071195 A1 | 3/2005 | Cassel et al. | |
| 2005/0086068 A1 | 4/2005 | Quigley et al. | |
| 2005/0187873 A1 * | 8/2005 | Labrou | G06Q 20/02 705/40 |
| 2005/0189416 A1 | 9/2005 | Charrin | |
| 2006/0224508 A1 | 10/2006 | Fietz | |
| 2006/0230000 A1 | 10/2006 | Lubinger | |
| 2007/0094088 A1 | 4/2007 | Mastie et al. | |
| 2007/0112948 A1 * | 5/2007 | Uhlik | H04L 12/14 709/223 |
| 2007/0113078 A1 | 5/2007 | Witt et al. | |
| 2007/0113104 A1 | 5/2007 | Witt et al. | |
| 2007/0255652 A1 | 11/2007 | Tumminaro | |
| 2007/0276765 A1 | 11/2007 | Hazel et al. | |
| 2007/0294528 A1 * | 12/2007 | Shoji | G06F 21/10 713/159 |
| 2009/0157811 A1 | 6/2009 | Bailor | |
| 2013/0246280 A1 * | 9/2013 | Kirsch | G06Q 20/14 705/71 |
| 2014/0168178 A1 | 6/2014 | Maloney et al. | |
| 2015/0269558 A1 * | 9/2015 | Basnet | G06Q 20/3255 705/14.23 |

OTHER PUBLICATIONS

Microsoft Press Computer Dictionary 3rd Edition, Microsoft Press, 1997.

* cited by examiner

```
                PHOENIX RESTAURANT
                14310 CULVER DR., #F
                   IRVINE, CA 92604
                PHONE: (949) 451-0086

------------------------------------------------

DATE: NOV. 22, 2004        #GUEST      2
SERVER: WALTER             TABLE       35
BILL: 0095                 TIME     07:55P

1 FRESH SEABASS                       16.00

1 SLICED PRIME RIB                     9.95

2 HOUSE SALAD                         10.50

------------------------------------------------
                           SUBTOTAL   36.45

SALES TAX   4.51
------------------------------------------------
TOTAL                                 40.96
```

FIG. 1

SYSTEMS AND METHODS FOR PREVENTION OF UNAUTHORIZED ACCESS TO RESOURCES OF AN INFORMATION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The present invention discloses an improved system and method for exchanging information in electronic formats between buyers, sellers and other authorized parties.

Description of the Related Art

In the course of transactions, buyers of goods and services ("Purchasers") and parties that sell to them ("Vendors"), typically exchange significant amounts of transaction specific data related to a discrete transaction such as, without limitation, billing information, payment amounts, Vendor name and address, date of transaction and a listing or listings of items transacted ("Specific Transaction Data"). In addition to Specific Transaction Data, additional data that is, e.g., related to or arises out of discrete transactions or prior or future transactions can also be exchanged. This information can include but not be limited to data about the Purchaser's buying preferences, participation in a buyer loyalty program or programs or purchase return history; the long term performance of an item or service transacted (for example, in the context of a transaction involving automobile repair services, an automobile service history or an update thereto) or other types of data (for example, in the case of a transaction involving healthcare or healthcare related services, relevant data such as a record of medical treatment received or medicine prescribed or dispensed or in the case of a proposed sale, information that is intended to assist the Purchaser in deciding whether or not to complete the transaction) (collectively "Information"). It is more common for Vendors and Purchasers to exchange Information in paper form and less common for Vendors and Purchasers to exchange Information in electronic form.

When Specific Transaction Data or Information is exchanged through manual methods (such as a Vendor hand-keying a Payment Card (as defined below) billing number into a Payment Card authorization terminal or a Vendor providing Specific Transaction Data to a Purchaser as printed information on a paper receipt), a heightened risk of errors introduced by the data entry process exists. In addition, manual data entry increases the time required to complete discrete transactions, thereby reducing both Vendor and Purchaser efficiency. Exchange of Specific Transaction Data or Information in electronic formats is one technique that is used in the art to reduce these errors and to increase efficiency in the transaction process. The availability of billing data in electronic formats provides Vendors with a number of significant advantages that include but are not limited to the capability to use semi-automated and automated data entry methods to improve the accuracy and speed of data capture, to facilitate faster transfer of data for internal and external use, to eliminate duplicative entry of transaction related data and to facilitate entry of data into non-transaction related systems (for example to enter customer information into tracking databases). For example, U.S. Pat. No. 6,826,535 to Wood, et al., discloses, inter alia, a method for reducing fraud and streamlining the insurance claim payment process in healthcare related transactions by using insurance eligibility and billing information stored on an integrated circuit or magnetic strip based "Smart Card" to enable service providers to determine whether the individual bearing the card is authorized to receive the requested services. As disclosed in the '535 patent, a patient seeking healthcare presents the Smart Card to a healthcare service provider who then uses information stored on the Smart Card to validate the patient's eligibility to receive the healthcare in question. A salient disadvantage of the '535 patent is that it does not provide a means whereby the patient, as Purchaser, can capture Specific Transaction Data or Information from the service provider, as Vendor. It should also be noted that a further disadvantage of the '535 patent is that it relies on integrated circuit or magnetic strip based Smart Cards which are limited both in terms of the amount of information they can store and, in the case of integrated circuit Smart Cards, by the limited availability of compatible data reading and writing devices in the U.S. market (thereby excluding more readily available portable data transport and storage mediums such as USB flash keys and Personal Digital Assistants).

Examples of technologies and techniques used to move Specific Transaction Data and Information in electronic formats from Purchasers to Vendors include magnetic strip based credit or debit cards (collectively "Payment Cards") including those described in U.S. Pat. No. 6,615,194 B1 to Deutsch et al.; Magnetic Ink Character Recognition ("MICR") formatted bank checks of the type referenced in U.S. Pat. No. 3,949,363 to Holm; integrated circuit based "Smart Cards" of the types described in U.S. Pat. No. 4,211,919 to Ugon and U.S. Pat. No. 4,701,601 to Francini et al. and "tokenless" transaction systems similar to the type disclosed in U.S. Pat. No. 6,269,348 B1 to Pare, Jr. et al., as well as RFID devices of the type now ubiquitous.

To the extent that these systems and technologies have been applied to generate capabilities to move Specific Transaction Data or Information from Vendors to Purchasers in electronic form, these capabilities have been limited and have not generally provided Purchasers with the same degree of access to electronic data afforded to Vendors. It is still very common for Vendors to provide only limited subsets of available Specific Transaction Data (primarily direct transaction data such as the Vendor's name, the date of the transaction, a list of the items or services transacted, the prices associated with the specific transaction and a transaction identifier number (collectively "Limited Transaction Data"). Typically, Vendors provide Limited Transaction Data to Purchasers in the form of printed paper receipts at the time the transaction ends (as shown in FIG. 1 which depicts the layout of an exemplary prior art paper receipt).

To the extent Purchasers wish to obtain Specific Transaction Data or Information immediately after completing the transaction, typically, only Limited Transaction Data is available and then only in hard copy format (such as a paper receipt). In particular, in the case of Information, it is uncommon for Vendors to provide Purchasers with information at the time of the transaction in an electronic format. To the extent Purchasers wish to obtain Specific Transaction Data or Information but do not require it at the time of the transaction, depending on the method of payment utilized by the Purchaser (i.e., as long as the transaction involves a payment method other than cash and involves an Intermediary), Purchasers may also obtain access to the Limited Transaction Data via Internet download or mailed hardcopies from Vendors, Intermediaries, or via other networks and entities (collectively "Intermediary Downloads"). The transaction information available through Intermediary Downloads in such case is usually a further limited subset of the Limited Transaction Data; commonly, specific information about exactly what items or services were transacted is not available and instead a summary number representing the total value of the transaction is the only pricing information available. For the purposes of this teaching, this subset of Limited Transaction Data will be referred to as a "Limited Download". An example of this method is disclosed in U.S. Pat. No. 5,699,528 to Hogan, incorporated herein by reference in its entirety.

U.S. Pat. No. 6,775,670 to Bessette discloses, inter alia, a method for managing medical information in which a "mobile communications system" utilizes a unique identifier associated with an individual, and stored on an integrated circuit Smart Card, to retrieve medical records pertaining to that individual from a server located within a network system. The individual's identifier is linked to "pointers", also stored on the Smart Card, that identify the locations on the server at which the referenced individual's medical information can be found. A disadvantage of this system is that although provision is made to allow medical records to be located based on information contained on the Smart Card, the information stored on the Smart Card is insufficiently secured from disclosure to or use by unauthorized parties. Further, the '670 patent provides neither a means whereby the individual's information can be authenticated as being from a trusted provider of data, nor a means whereby the individual's information can be validated as being in the form in which it was originally issued (i.e., being free from error, truncation or modification).

U.S. Pat. No. 5,884,271 to Pitroda discloses, inter alia, a "universal electronic transaction card" which can accept transfers of transaction information from point of sale terminals in electronic form. A disadvantage of this system is that although the transaction information is captured in electronic form, no provision is made to allow users to verify the source of the data. Further, the invention of the '271 patent does not provide for a means to verify that the transaction information was not modified after its initial creation. Finally, the invention of the '271 patent provides neither a means to secure the recorded transaction information from unauthorized use or modification nor a means to make authorized annotations to the captured transaction information.

For purposes of substituting electronic transaction data records for paper records in the context of accounting, finance and audits (both private and government), both authentication that the receipt was issued by the Vendor purported to have identified the receipt and verification that the data contained in the electronic receipt has not been modified after creation are arguably necessary features. Certain unique features of cryptographic methods can be applied to characterize data in binary formats to achieve defined levels of certainty with results that are very useful in the context of this Invention. Examples of such cryptographic methods are well known to those of ordinary skill in the art and will be covered only in brief here.

For example, symmetric cryptography is a cryptographic method that uses a single numeric key to perform both encryption and decryption. In contrast, asymmetric cryptography or dual key cryptography of the general type taught by Whitfield Diffie and Martin Hellman is a form of encryption in which the encryption/decryption keys are numerical values that exist in matching pairs such that what one of the keys encrypts, only the matching key can decrypt.

In asymmetric cryptography, typically one key of the pair is kept secret (the "Private Key") and one key of the pair is disclosed to the public and identified as belonging to the party controlling the Private Key (the "Public Key"). Public Key Infrastructures ("PKI") use trusted directories of information about Public Keys and their issuers in conjunction with asymmetric cryptography to provide assurances to recipients of asymmetrically encrypted files that Public Keys, and by extension information secured via asymmetric cryptography methods employing said Public Keys, indeed correspond to expected and claimed Private Key holders.

Secure hash algorithms, such as the SHA-1, SHA-224, SHA-256, SHA-384 and SHA-512 algorithms described in the U.S. Government's Federal Information Processing Standards Publication 180-2 (as amended); Ron Rivest's MD-4 and MD-5 algorithms and the Snerfu family of message digest functions developed by Ralph Merkle are well known in the art as one-way hash functions that convert variable length binary input strings into fixed length binary output strings that are a condensed representation of the electronic data contained in the binary input string (a "Message Digest"). One-way hash algorithms can be used to create secure indicators of binary file data integrity in the sense that they are designed such that for a given Message Digest created by processing a binary file with a one-way hash algorithm, it is computationally infeasible to find a different binary file that, when processed with a one-way hash algorithm, will create a second Message Digest that is identical to the Message Digest created using the first binary file. Symmetric cryptography, asymmetric cryptography, one-way hash and PIG methodologies are well known in the art.

U.S. Pat. No. 6,516,996 B1 to Hippelainen describes an application of PKI and asymmetric cryptography methodologies to the problem of providing authentication of receipts issued by Vendors to Purchasers. A disadvantage of this system is that the asymmetric encryption methodology employed by the disclosed invention is calculation intensive. This makes the invention less suitable for use when the capacity to support high volumes of transactions within a short period is required or when reduced computing power is available. Another disadvantage of the '996 patent is that the disclosed system does not provide for a means whereby the Purchaser can read or otherwise use the transaction data contained in the electronic receipt while the receipt is encrypted. Another disadvantage is that the '996 patent does not disclose a system whereby the Purchaser can access the discrete transaction information within a given record electronically while at the same time retaining the ability to verify the authenticity of the transaction receipt, because, as described in the '996 patent, the encryption alone is the guarantee of the authenticity of the electronic receipt and yet, in order to read discrete transaction data within an electronic receipt a Purchaser must decrypt the electronic receipt. Another disadvantage of the '996 patent is that it contemplates encryption of only purchase receipts, excluding the broader category of Information. Yet another disadvantage of the '996 patent is that it does not provide an integrated means whereby the Purchaser can securely pass billing Information in electronic form to the Vendor and then receive Information from the Vendor in electronic form.

Each of the prior art methods described above provides Vendors and Purchasers with less than optimal methods to share Specific Transaction Data and Information, capture Specific Transaction Data and Information, transport Specific Transaction Data and Information and upload Specific Transaction Data and Information into their own computers for use. What is needed is an integrated yet portable means and methodology whereby a Purchaser can, inter alia, securely provide Specific Transaction Data and Information in an electronic format to a Vendor; if necessary, authenticate his or her right to use the Specific Transaction Data to complete a purchase and receive the resulting Specific Transaction Data and Information related to that transaction in an electronic format. Ideally, such format can be easily read, transported and used, but at the same time can be authenticated as being issued by the specific Vendor involved in the transaction and validated as being in the form originally issued by the specific Vendor.

SUMMARY OF THE INVENTION

The present invention satisfies the foregoing needs by providing improved apparatus and methods for transaction data exchange.

In a first aspect of the invention, a robust and integrated apparatus and associated method is provided whereby a Purchaser can securely provide Specific Transaction Data and Information in an electronic format to a Vendor. In one exemplary embodiment, the Purchaser can authenticate his or her right to use the billing information contained therein to complete a purchase without actually having to disclose the billing information in a human readable format, thereby enabling the Vendor to obtain and authenticate the Purchaser's identity and billing information while still protecting the Purchaser's privacy and without requiring disclosure of the Purchaser's billing information to the Vendor's employees and unauthorized parties.

In a second aspect of the invention, apparatus and associated methods are provided whereby a Vendor can provide a Purchaser with Specific Transaction Data about a transaction(s) and/or additional Information related to that transaction. In one exemplary embodiment, the Data/Information is provided in a format that can be read and used by the Purchaser and other authorized parties with minimal manual entry of Information.

In a third aspect of the invention, apparatus and associated methods are provided whereby Vendors may provide Purchasers with Specific Transaction Data and Information. In one exemplary embodiment, the Specific Transaction Data and/or Information is provided in a format that provides the Purchaser and other parties subsequently accessing or using the Specific Transaction Data and Information with assurances that the electronic file containing the Specific Transaction Data and Information was created by a defined Vendor and is unmodified from the form originally issued by the defined Vendor (in one exemplary embodiment, allowing the electronic file to replace a paper hardcopy receipt as the permanent record of the transaction for purposes including but not limited to accounting, audit and tax reporting).

In a fourth aspect of the invention, apparatus and associated methods are provided whereby Vendors, Purchasers and other authorized users can securely exchange Specific Transaction Data and Information in electronic formats either at the time of the transaction or at some other mutually agreed time. In one representative application, a Purchaser will present billing information to the Vendor in an encrypted electronic file, the Vendor will use the presented billing information to complete a sale and then the Vendor will provide an encrypted electronic file containing Specific Transaction Data about the details of that transaction and optionally additional Information back to the Purchaser. In addition to providing only billing information required for a specific transaction, the Purchaser may optionally provide other relevant Information to the Vendor (for example past purchase Information or customer loyalty program identification Information).

In a fifth aspect of the invention, apparatus and associated methods are provided whereby an electronic data transfer hub (a "Hub") is connected to a device (e.g., a point of sale terminal or personal computer) to permit Vendors and Purchasers to exchange Specific Transaction Data and Information in multiple electronic formats.

In a sixth aspect of the invention, apparatus and associated methods are provided whereby a device (e.g., a Data Transfer Device) may be used to allow Purchasers to send and receive Specific Transaction Data and other Information to and from the aforementioned hub and to transport, communicate and annotate Specific Transaction Data and Information received from said Hub in a secure format on a single device that will include protections securing the Specific Transaction Data and Information stored on the Data Transfer Device against unauthorized use or disclosure.

In a seventh aspect of the invention, apparatus and associated methods are provided whereby a device such as a Data Transfer Device may be used to allow secure transfer of Information that is not related to a specific transaction.

In an eighth aspect of the invention, apparatus, an integrated multi-purpose means of securely transferring Information other than Specific Transaction Data between Vendors, Purchasers and other parties is disclosed.

One aspect of the disclosure relates to an information security system to restrict use of encrypted data. The information security system comprises a fingerprint scanner configured to scan a fingerprint and provide fingerprint data associated with the scanned fingerprint; a radio transceiver comprising memory and associated with the fingerprint scanner, the radio transceiver configured to store in the memory encrypted data that includes fingerprint data from one or more authorized users in a first portion and second data in a second portion; and a hub device comprising a first data interface configured to communicate with the radio transceiver and the fingerprint scanner, and a second data interface configured to communicate with a third party device. The hub device is configured to receive, via the first interface, the encrypted data from the memory and the fingerprint data associated with the scanned fingerprint of a user from the fingerprint scanner; decrypt the first portion of the encrypted data to provide decrypted fingerprint data; compare the decrypted fingerprint data with the fingerprint data associated with the scanned fingerprint of the user; determine that the decrypted fingerprint data matches the fingerprint data associated with the scanned fingerprint of the user; after said determine, identify the user as an authorized user of the one or more authorized users; and after said identify, provide the second data to the third party device via the second data interface.

One aspect of the disclosure relates to a method to restrict use of encrypted data. The method comprises storing on a cell phone data indicative of fingerprints of one or more authorized users of the cell phone; storing on the cell phone encrypted information; reading a fingerprint of a user with a fingerprint scanner included on the cell phone; generating user fingerprint data indicative of the read fingerprint of the user; comparing the user fingerprint data indicative of the read fingerprint of the user with the stored data indicative of the fingerprints of the one or more authorized users of the cell phone; determining that the comparison of the user fingerprint data with the stored data indicative of the fingerprints of the one or more authorized users of the cell phone indicates that the user fingerprint data matches at least one fingerprint in the stored data indicative of fingerprints of the one or more authorized users of the cell phone; after said determining that the comparison indicates that the user fingerprint data matches the at least one fingerprint in the stored data, determining that the user is an authorized user of the one or more authorized users of the cell phone; transmitting wirelessly with the cell phone encrypted information stored on the cell phone directly to a first device using one of infrared-based communication and radio frequency-based communication; after said determining that the user is the authorized user, authorizing use of the encrypted information; and receiving wirelessly a confirmation with the cell phone directly from the first device using one of the infrared-based communication and the radio frequency-based communication, the confirmation indicating that the use of the encrypted information has been completed, the confirmation including at least one data structure comprising data associated with the use of the encrypted information.

In an embodiment, the method further comprises adding a one-way hash algorithm identifier to the confirmation. In an embodiment, the method further comprises applying the one-way hash algorithm to the confirmation. In an embodiment, the method further comprises encrypting the hashed confirmation with a key to provide an encrypted record. In an embodiment, the method further comprises attaching the encrypted record to the confirmation to create a consolidated information file. In an embodiment, the method further comprises storing in the cell phone the consolidated information file.

One aspect of the disclosure relates to a method to restrict use of encrypted data. The method comprises storing information on a data transfer device, the information comprising authentication data identifying one or more users authorized to use the data transfer device; providing the information from the data transfer device associated with a current one of the one or more users to a first device associated with a first party; collecting, via the data transfer device, identity data associated with the current one of the one or more users; providing the identity data to the first device associated with the first party; after a determination that the authentication data matches the identity data, authenticating a right of the current one of the one or more users to permit access to a restricted portion of the information; subsequent to said authenticating the right, permitting access to the restricted portion of the information; and storing, on the data transfer device, a record comprising at least one data structure comprising data associated with the access to the restricted portion of the information.

In an embodiment, the authentication data comprises data representative of a fingerprint of the one or more users authorized to use the data transfer device, and wherein the authentication data stored on the data transfer device is not in a human readable format. In an embodiment, the authentication data further comprises a personal identification number. In an embodiment, said authenticating utilizes at least dual key encryption.

In an embodiment, the method further comprises validating at least a portion of the information using at least a one-way hash algorithm. In an embodiment, the at least one data structure further comprises data associated with completion of the access to the restricted portion of the information and wherein the restricted portion of the information is not in a human readable format. In an embodiment, the data associated with completion of the access to the restricted portion of the information comprises an encrypted indicator. In an embodiment, the encrypted indicator comprises a hashed electronic document.

Aspects of the disclosure relate to an information security system to restrict use of encrypted data. The information security system comprises a biometric data reader configured to read biometrics and provide biometric data associated with the read biometric; a data transfer device configured to store information that comprises authentication data identifying one or more users authorized to use the data transfer device and restricted data; and a first device in communication with the biometric data reader and the data transfer device, the first device configured to receive biometric data associated with a user of the data transfer device and the information, compare the biometric data associated with the user of the data transfer device with the authentication data, determine that the biometric data associated with the user of the data transfer device matches the authentication data, and subsequent to the determination that the biometric data matches the authentication data, permit use of the restricted data.

In an embodiment, the data transfer device is further configured to store data associated with completion of the use of the restricted data. In an embodiment, the restricted data is encrypted, and the authentication data stored on the data transfer device is not in a human readable format. In an embodiment, the data transfer device comprises the biometric data reader. In an embodiment, the biometric data reader comprises a fingerprint acquisition device and the biometric data associated with the user comprises data representative of the user's fingerprint entered on the fingerprint acquisition device.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same of similar system parts and/or method steps, and:

FIG. 1 is a depiction of a typical prior art paper based printed transaction receipt.

DETAILED DESCRIPTION OF THE PREFERRED EMBODIMENT

Figure 2:
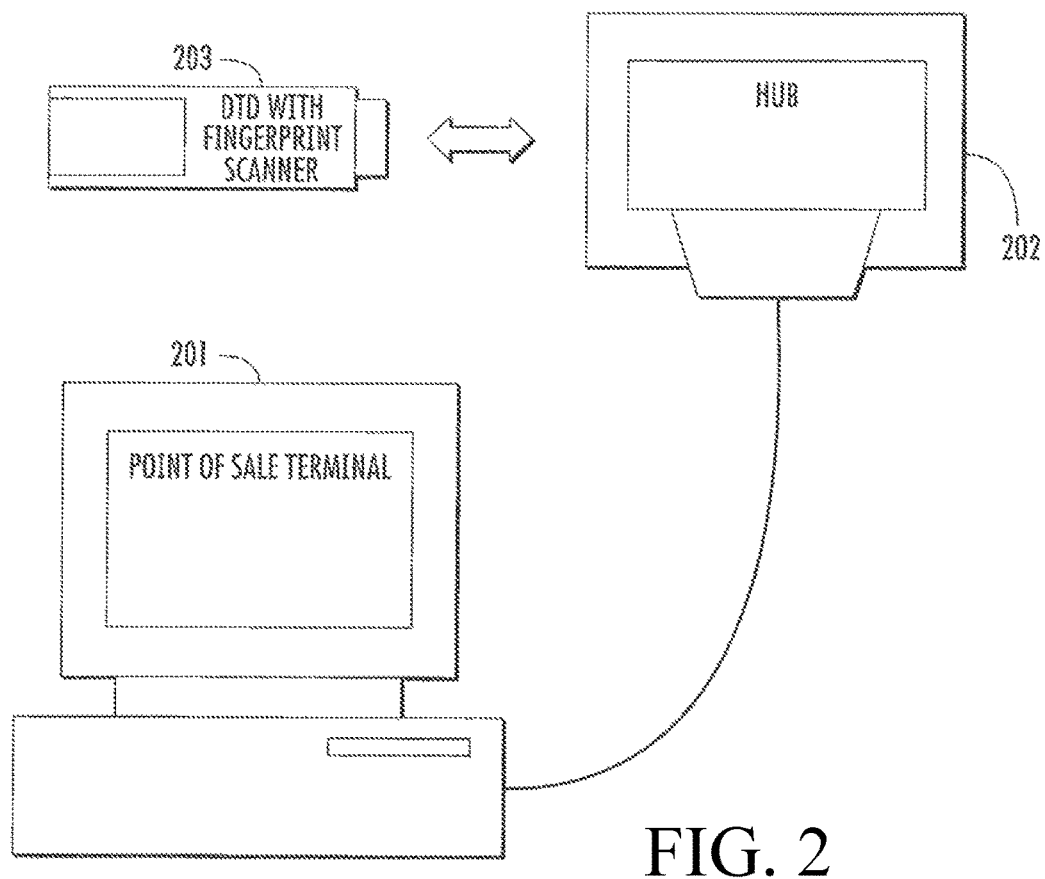
FIG. 2 is a diagram illustrating the basic components of an exemplary Vendor side configuration of a system conforming to the principles taught in the instant invention.

The following descriptions are exemplary embodiments of the invention and are not intended to limit the scope, applicability or configuration of the invention in any way. Rather, the following description is intended to provide convenient illustrations for implementing various embodiments of the invention. It will be appreciated by one skilled in the art that various additions, substitutions or deletions may be made in the function, arrangement and/or combination of the elements described in these embodiments (as well as the sequence and content of steps described herein) to ascertain and/or realize any number of other benefits without departing from the spirit and scope of the instant invention.

It will also be recognized that while the exemplary embodiments are described in terms of one- or two-way transfers of data and/or information, the methods and apparatus of the invention may be readily adapted to three-way or other transfers of data, or even sequential transfers between three or more parties (e.g., from one party to an second to a third, and so forth). Further, one of ordinary skill in the art will recognize that alternate methods of verification and authentication providing features and functionality similar to those described herein may be applied to the invention disclosed herein without changing the novel principles taught.

Furthermore, while the exemplary embodiments presented herein are generally described in the context of transfers of data and/or information that are related or even contemporaneous with financial or other such transactions (e.g., the sale of an item or service, a visit to a physician's office, etc.), the invention is no way limited to such related or contemporaneous transactions or transfers. For example, a logically related transfer of information or data is contemplated, such as where the occurrence of an e.g., sales transaction between a first party and second party may instigate or act as a condition precedent to a second logically related transaction between a third and fourth party. Alternatively, a first transaction between the first and second party may act as a predicate for a later separate but related transaction or transfer of data/information between the same parties.

As used herein, the term "Data Transfer Device" (DTD) refers to a portable or semi-portable device incorporating, at a minimum, the ability to store or retain data in an electronic (including magnetic) or optical format. Optionally, the DTD may also incorporate additional capabilities, including but not limited to the ability to transmit, process, encrypt and decrypt data files and/or read biometric authentication information (for example a fingerprint scanner—examples of which include the Trek 2000 International, Ltd., Thumb-Drive™ Touch and the Memory Experts International Clip-Drive™ Bio). Examples in the art of DTDs include but are not limited to: cell phones, radio pagers, devices incorporating Microsoft Corporation's Smart Personal Objects Technology, personal digital assistants ("PDAs"), floppy disks, USB flash memory keys and other erasable programmable memory ("EPROM") based data storage devices; optical or holographic storage devices, data storage devices employing ferroelectric memory or magnetic random-access memory ("MRAM") based chips; IBM Micro Drives, integrated circuit "smart cards", magnetic strip based payment cards, both passive and active radio frequency identification technology ("RFID") based devices, devices designed to communicate using the Infrared Data Association's ("IrDA") infrared based wireless transmission standard, devices communicating via wireless radio frequency ("RF") based local area network ("LAN") connections based on the IEEE 802.11 or 802.15 access standards and related variations (including both frequency hopping and direct sequence spread spectrum variants), devices designed to exchange data via the "Bluetooth" 2.45 GHz frequency band based wireless communication specification, devices designed to exchange data via the Wireless USB standard and devices designed to exchange data via Panasonic "Smart SD" (Secure Digital) cards.

As used herein, the term "Vendor" refers generally to any source or prospective source of goods, services, data or information of interest, while the term "Purchaser" refers generally to any one or more users or prospective users of goods, services, data or information. For example, in the context previously described herein, a Vendor may comprise a seller or provider of goods or services, while a Purchaser may comprise a buyer of such goods or services. Alternatively, a Vendor may comprise for example a patient (or group of patients) associated with a physician, who acts as a source of medical or personal data, while the Purchaser may comprise the physician or his parent health care organization or hospital. As another example, a Purchaser or Vendor may comprise a vehicle owner, and the Vendor or Purchaser a mechanic or repair facility that receives or captures data relating to the vehicle.

Furthermore, the terms "Purchaser" and "Vendor" are used in the broad sense and the use of such terms is not intended to imply that the applicability of the instant invention is limited to the period immediately before, during or after a transaction. For example, a "Purchaser" could also mean an entity only considering a purchase and a "Vendor" could also mean an entity only proposing a sale to the Purchaser.

Distributed databases and related methods of synchronizing multiple databases and data files, including but not limited to independent distributed database systems of the type taught in U.S. Pat. No. 6,446,092 B1 to Sutter, are well known in the art and coordinate distribution and synchronization of data across multiple discrete databases in order to allow a related set of data to be shared among multiple users in situations in which connections between databases are not stable, but rather are transient in nature.

Point of Sale Terminals ("POSTs") are well known in the art and include, e.g., electronic cash registers or personal computers running appropriate software that, at a minimum, enable processing and tracking of data related to transactions between Vendors and Purchasers. Optionally, POSTs may incorporate additional capabilities, including but not limited to, the ability to record and track customer orders; read data from and write data to DTDs, both wirelessly and utilizing wired connections; process credit and debit cards and connect to other systems in a network and manage inventory. Common and more sophisticated examples of POSTs include the Epson IM-800, the IBM SurePOS 700, the Verifone Omni 3700 family and the Hypercom ICE 5700Plus and are described in U.S. Pat. No. 6,533,168 B1 to Ching, U.S. Pat. No. 6,615,194 B1 to Deutsch et al. and U.S. Pat. No. 6,701,192 B1 to Herwig, all of which are incorporated herein by reference in their entireties. It should be appreciated that alternative devices or systems allowing calculation and recording of transaction data in electronic formats may be substituted without affecting the spirit and scope of the instant invention As used herein, the term "hub" refers generally to a device incorporating means to read data from and write data to devices such as DTDs, either wirelessly or alternatively, utilizing wired connections, and to communicate such data to other devices (whether separate or integrated) such as POSTs. Hubs may also contain additional functionality related to receiving and transmitting Specific Transaction Data and Information between peripheral devices and POSTs, such as the ability to read biometric data for purposes of analyzing and utilizing such data and/or transmitting such data to connected devices for analysis and use. Hubs may be stand-alone devices or may exist as a device or devices providing such functionality integrated into POSTs.

As used herein, the terms "software" and "computer program," refer generally (but not exclusively) to describe code or other instructions to a computerized device or devices that perform a sequence or series of steps. Such programs (and their routines/subroutines) may be rendered in any language including, without limitation, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like. The term is also meant to encompass distributed software/applications, wherein a portion of an application or software process (or collection of applications/process) are in logical or data communication with other related applications/processes. In general, however, all of the aforementioned terms as used herein are meant to encompass any series of logical steps performed in a sequence to accomplish a given purpose.

As used herein, the term "healthcare entity" refers generally to any entity. group or individual that directly or indirectly provides, arranges, and/or makes payment and/or billing transactions relating to, one or more healthcare services. Examples of such healthcare entities include, without limitation, HMOs, PPOs, hospitals, clinics, physicians, holistic or homeopathic practitioners, chiropractors, laboratories, acupuncturists, university clinics and research programs, and insurers.

Overview

The subject invention relates generally to apparatus and methods adapted to facilitate the transfer of data and information (including Specific Transaction Data and Information) in electronic formats between various entities such as Vendors, Purchasers and other authorized parties. It should be noted that in one salient aspect, the instant invention is intended to provide users with a standardized method with which to transfer a wide variety of data and information types. For example, in the context of control and/or monitoring of equipment (such as an automobile), the invention disclosed herein provides a means whereby the Data Transfer Device may be employed to transfer data and information from said equipment to authorized users of the data and information (for example, in the case of an automobile, the owner of the automobile might download diagnostic and performance data from the automobile onto the Data Transfer Device by means of a Hub integrated with the automobile's systems. In such case, the owner might then provide said diagnostic and performance data to a Vendor providing automotive repair services to said owner in an electronic format as a further download from the DTD to the Vendor's computer for subsequently analysis).

This transfer of data or information can serve multiple purposes, including, but not limited to, support of transactions (for example transfers of Specific Transaction Data to or from Payment Card issuers or banks) or making Specific Transaction Data or Information available to parties that have an authorized use for the Specific Transaction Data or Information (for example in the context of expense reimbursements, to companies providing services to Purchasers and employers of the Purchasers related to processing the data for expense reimbursement purposes or in the case of healthcare providers, transfers of healthcare information about a patient from a treating physician to a new physician who will begin providing care to the patient).

One exemplary embodiment set forth herein relates to a data exchange apparatus and method for: (1) integrating electronic transmissions of billing data from Purchasers to Vendors with electronic transmissions of Specific Transaction Data and Information from Vendors to Purchasers; (2) securing Specific Transaction Data and Information from unauthorized disclosure or use (i.e., providing data/information confidentiality); (3) facilitating exchanges of Specific Transaction Data and Information between Purchasers, Vendors and related authorized parties; (4) providing a means for verifying the originator/source (authentication) and/or accuracy (verification or validation) of Specific Transaction Data and Information, and (5) facilitating electronic exchanges of Specific Transaction Data and Information between Vendors, Purchasers and other parties playing a role in the transaction or having an authorized use for the Specific Transaction Data and Information.

Benefits obtained from utilization of the apparatus and methods disclosed herein include (i) reduction of errors caused by manually (or even electronically) entering and reentering data or information; (ii) reduction of the number of times that data or information must be entered (thereby improving efficiency); (iii) provision of some level of assurance to the users of the transferred data/information regarding the source and nature of the data; (iv) authentication regarding the source of the transacted data or information; (v) validation that the transferred data/information is in the same form and comprises the same content it was in at the time it was generated or sent.

Vendor Side Exemplary System Layout

In FIG. 2, the diagram illustrates the basic components of the Vendor side of an exemplary system conforming to the principles taught in the instant invention. The Vendor's POST 201 is in data communication via wired or wireless means to a Hub 202. The Hub 202 incorporates, at a minimum, wired or wireless means for communicating with DTDs of various types (collectively represented by 203) and may or may not be connected to an independent power source (not shown).

Purchaser Side Exemplary System Layout

Figure 3:
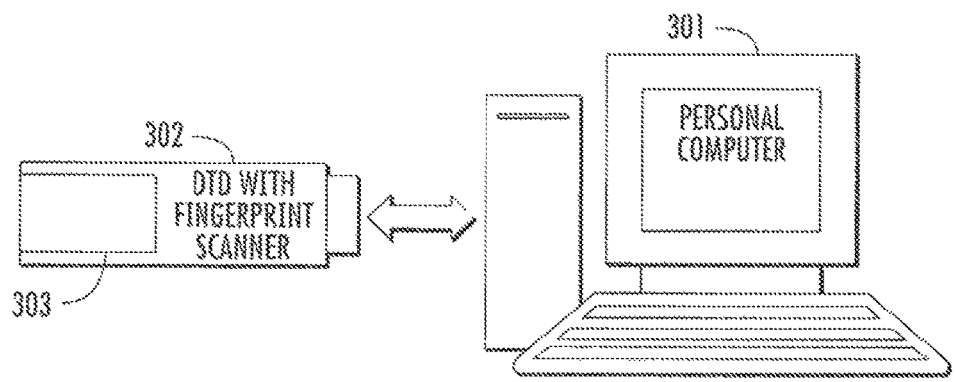
FIG. 3 is a diagram illustrating the basic components of an exemplary Purchaser side configuration of a system conforming to the principles taught in the instant invention.

In FIG. 3, the diagram illustrates the basic components of the Purchaser side of an exemplary system conforming to the principles taught in the instant invention. DTDs of various types (collectively represented by 302) connect to a Purchaser's personal computer 301 by wired or wireless means as dictated by the requirements of the specific DTD used. The DTD 302, as depicted, incorporates a fingerprint scanner 303 (although this is not a mandatory aspect of the DTD 302 configuration).

Vendor Side Data Transfer

Figure 4:
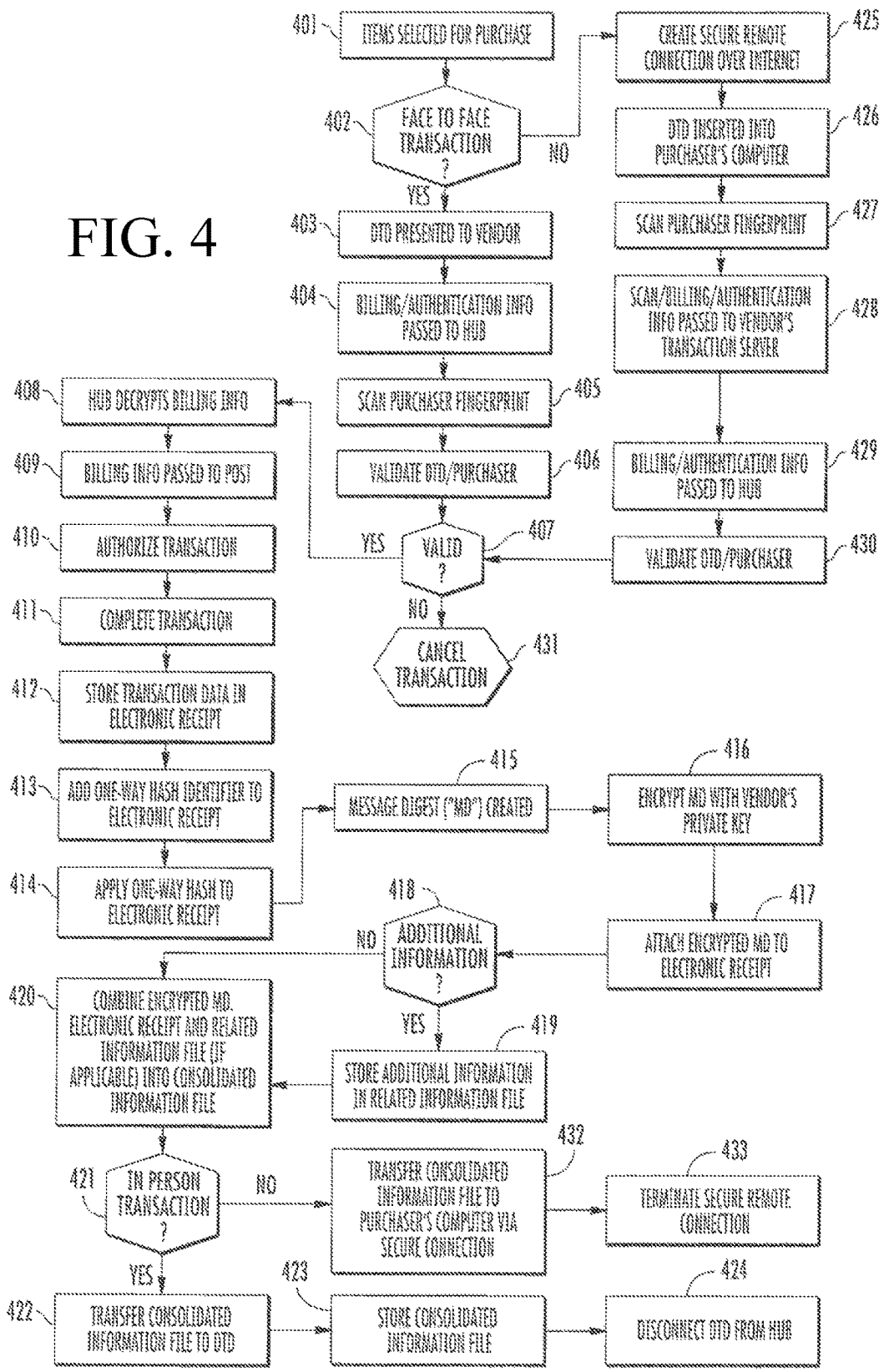
FIG. 4 is a flowchart of an exemplary method of providing billing information, creating a Consolidated Information File (as such term is defined herein) and providing the Information File to a Purchaser according to the invention.

FIG. 4, is a logical flowchart showing one embodiment of a method of enabling a Purchaser to provide a Vendor with billing information in an electronic format and enabling a Vendor to provide a Purchaser with transaction specific Information and other related Information in an electronic format that can be transferred by a Purchaser into his or her computer without manually reentering the information, and yet may be authenticated as to source and integrity.

In accordance with an aspect of the present invention, in a transaction between a Vendor and a Purchaser, the subject of the purchase (whether a tangible or non-tangible item) is identified (step 401). If the transaction is in-person, the DTD 203 is presented to the Vendor (step 403). The Vendor connects the DTD 203 to a Hub 202 either built in to the Vendor's POST (not shown) or attached to the Vendor's POST 201. In one embodiment of the present invention, the POST 201 is a self-service kiosk allowing Purchasers to purchase goods or services, or conduct airline check-in or hotel check-in/check-out activities with minimal or no additional assistance from Vendor representatives.

It will be appreciated by one skilled in the art that the DTD 203 may be capable of employing one or more of a multiplicity of wired and wireless connection methods and protocols to communicate data to and from the Hub 202. Physical connections and proximity between the Hub 202 and the DTD 203 are optional and dependent on the operational requirements of the specific application of the principals taught herein. All such methods are within the scope of the instant invention.

The Hub 202 reads the encrypted billing information (which may include Purchaser authentication data identifying the thumbprint(s) of the party(ies) authorized to use the DTD 203) stored on the DTD 203 (step 404) and decrypts the Purchaser authentication data stored in the encrypted billing information. Optionally, additional Information may also be stored on the DTD 203 and read by the Hub 202. The Hub 202 then authenticates the identity of the Purchaser by reading the thumbprint of the Purchaser presenting the DTD 203 (step 405) by means of a thumbprint scanner present on either the Hub 202 or the DTD 203 and then comparing that data against the decrypted Purchaser authentication data (step 406). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the Hub 202 decrypts the billing information (step 408), indicates to the POST 201 that the transaction may proceed and passes the decrypted billing information to the POST 201 (step 409). The POST 201 then uses existing credit card transaction approval methods to confirm that the billing account is valid for use (step 410). If the Purchaser is not authenticated or the transaction is rejected, the Hub 202 alerts the POST 201 which then cancels the transaction (step 431) or alternatively, requests an alternate method of payment. If the Purchaser is authenticated and the transaction is approved, the POST 201 then completes the transaction (step 411). In an alternate implementation, a personal identification number can be used instead of the thumbprint information to authenticate the purchaser or can be used in addition to the thumbprint information to provide additional assurances that the Purchaser is authorized to transact purchases using the billing information on the DTD 203. In a further alternate implementation, the transaction may be completed using billing information not stored on the DTD 203 (for example a purchase based on a payment of cash).

After the transaction is completed, Specific Transaction Data, including, optimally, the name of the vendor, the date of the transaction, the list of the items transacted (with individual prices), the subtotal of the transaction, the tax (if applicable), the total of the transaction purchase price, the Vendor's transaction identifier number (if applicable) and a Payment Card transaction reference number (if applicable) is electronically stored in a binary file (the "Electronic Receipt") (step 412). Information identifying the One-Way Hash Algorithm that will be applied to the Electronic Receipt is also stored in the Electronic Receipt (step 413). A One-Way Hash algorithm is then applied to the Electronic Receipt (step 414) yielding a Message Digest that is unique to the Electronic Receipt (step 415). The Message Digest is then encrypted using a Private Key belonging to the Vendor (step 416) yielding an Encrypted Message Digest that is unique to the specific transaction and Vendor. The Encrypted Message Digest is then attached to the Electronic Receipt (step 417). If desired, additional Information indirectly related to the transaction at hand (for example Vendor or Purchaser provided comments, data relating to the Purchaser's participation in the Vendor's loyalty program or in the case of a medical Vendor, updates to the Purchaser's medical record or other relevant data), may also be either included in the Electronic Receipt or stored in a separate, preferably encrypted electronic file (a "Related Information File") or both (step 419). Optionally, a One-Way Hash Algorithm can be applied to the Related Information File in the same manner as described above with respect to the Electronic Receipt to create an Encrypted Message Digest corresponding to the Related Information File.

The Encrypted Message Digest, the Electronic Receipt and the Related Information File (if applicable) are then combined into a binary file or file set (hereinafter be referred to as an "Consolidated Information File") (step 420). If the transaction is being conducted in person, the Consolidated Information File will be transferred from the Hub 201 to the DTD 203 (step 422) where it will be stored as an individual file or checked into a software application along with other Consolidated Information Files for secure (encrypted) or nonsecure storage (step 423). The DTD 203 can then be disconnected (whether physically or wirelessly connected) from the Hub 202 (step 424).

If the transaction is not being conducted in person (for example a transaction conducted over the Internet), the process will be largely the same as described above except: following step 402, the Purchaser establishes a secure connection between their web browser software and the Vendor's transaction server using one of several secure communication standards (such as Secure Socket Layer) that are well known in the art (step 425). The Purchaser is then prompted to connect the DTD 302 (whether via wireless or wired connection) to a hardware connection on their computer 301 (step 426). Depending on the specific configuration of the DTD 302, various wired and/or wireless connection standards may be used either singly or in conjunction with additional hardware attached to the Purchaser's computer 301. A thumbprint scanner 303 present on the DTD 302 reads the thumbprint of the Purchaser (step 427). The thumbprint scan information and the encrypted billing information (which includes encrypted authentication information including data identifying the characteristics of the authorized billing party's thumbprint) on the DTD 302 are then transferred to the transaction server via the secured connection (step 428). Software on the transaction server then transfers the thumbprint scan information and the billing information to the Hub 202 (step 429). The Hub 202 decrypts the Purchaser authentication data stored in the encrypted billing information and then uses the thumbprint scan information to authenticate the identity of the Purchaser by comparing the thumbprint scan information to the decrypted Purchaser authentication information (step 430). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the transaction is completed as per the method for in-person transactions (beginning at step 408) with the difference that, after step 416, rather than transferring the Consolidated Information File to the DTD 203, the Hub 202 transfers the Consolidated Information File to the transaction server which in turn transfers the Consolidated Information File back to the Purchaser's computer 301 via the secured connection (step 432). The secure connection is then terminated (step 433).

It will be appreciated by one of ordinary skill in the art that the exemplary transaction described above incorporates certain elements that are optional and that can be changed or omitted without materially changing the scope or nature of the instant invention. For example, in the event that a Vendor wishes to transfer Specific Transaction Data or Information to a Purchaser without first completing a transaction (such as in a case where the data pertains to a previously completed transaction, or where a healthcare provider wishes to provide Information comprising healthcare treatment or pharmaceutical prescription records to a patient), the required data would simply be selected and then stored pursuant to the process disclosed above beginning with storage of said data in an electronic file (step 412). From that step forward, the process would proceed as previously disclosed.

Purchaser Side Data Transfer

Figure 5:
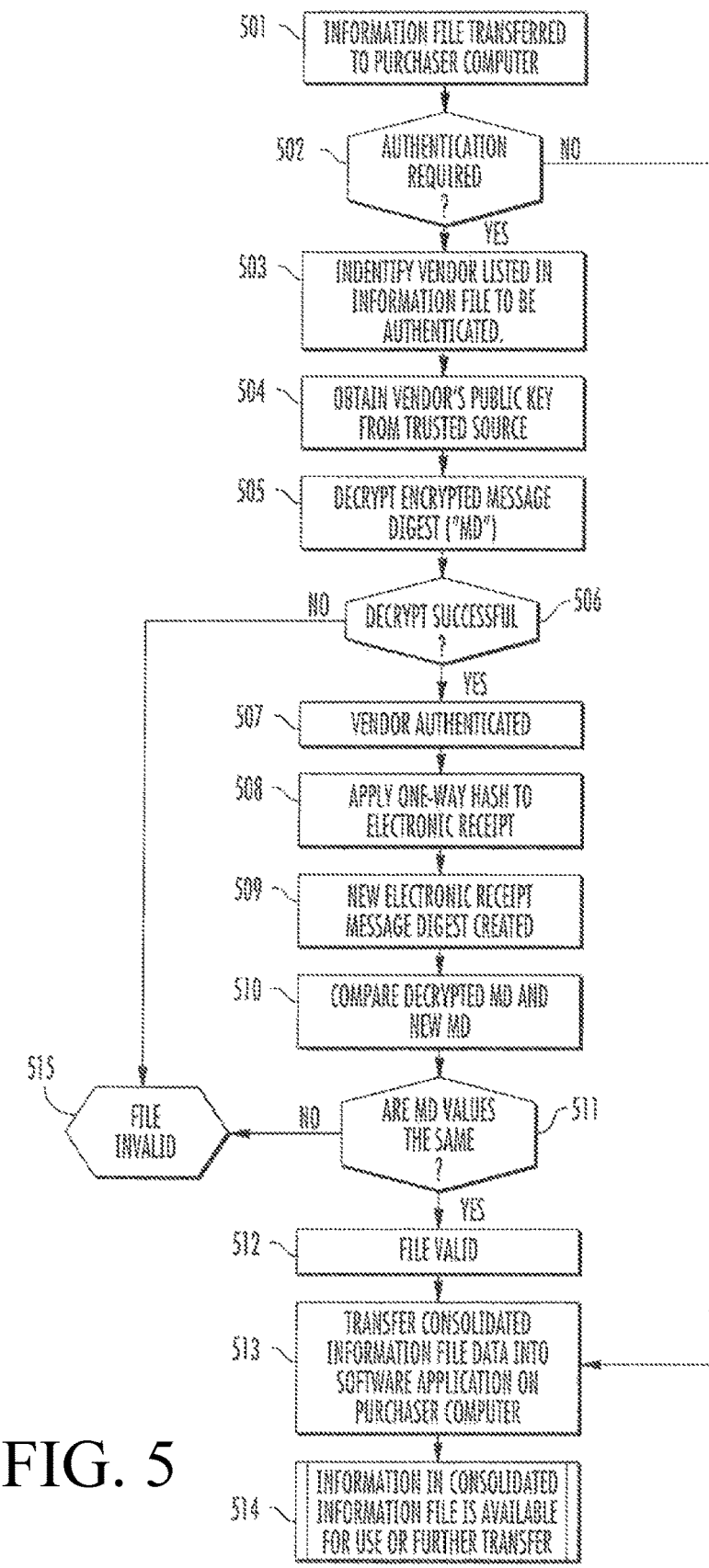
FIG. 5 is a flowchart of an exemplary method of verifying the authenticity and integrity of elements within a Consolidated Information File and making the Consolidated Information File available for use by a Purchaser or another party authorized to access the Consolidated Information File according to the invention.

FIG. 5 is a logical flowchart showing one embodiment of a method of enabling a Purchaser to use data in a Consolidated Information File, authenticate an Electronic Receipt as to source, determine whether an Electronic Receipt has been modified since its creation and to make the data available for further use. A Consolidated Information File containing Specific Transaction Data and/or Information is transferred to a Purchaser designated computer (step 501). If authentication of the Electronic Receipt within the Consolidated Information File is not required, a synchronization application on the computer transfers the Specific Transaction Data and/or Information in the Consolidated Information File to a Purchaser designated software application or applications enabling storage, analysis, use and transfers of said Specific Transaction Data and/or Information (step 512). If authentication of Electronic Receipt within the Consolidated Information File is required, the Purchaser or another party authorized by the Purchaser to authenticate Electronic Receipt (collectively referred to herein as a "Verifying Party"), so indicates in a software application executing on the Purchaser's computer 301 and designed, at least in part, to work in conjunction with the Consolidated Information Files (step 502). The software application reads the Vendor Information from the Electronic Receipt to identify the Vendor corresponding to the Electronic Receipt to be authenticated (step 503). The software application then refers to a trusted internal or external database or on-line service (a "Trusted Source") to obtain the Public Key that corresponds to the Vendor identified in the Electronic Receipt (step 504). The software then uses the Vendor's Public Key to decrypt the Encrypted Receipt Message Digest component of the Consolidated Information File (step 505). If the Public Key provided by the Trusted Source does not decrypt the Encrypted Receipt Message Digest successfully, the software indicates to the Verifying Party that the Electronic Receipt is not authenticated as having been created by the Vendor identified in the Consolidated Information File (step 514) and the process stops. If the Public Key provided by the Trusted Source successfully decrypts the Encrypted Receipt Message Digest, a decrypted Message Digest derived from the Encrypted Receipt Message Digest is created and the software indicates to the Verifying Party that the Electronic Receipt is authenticated as having been created by the Vendor identified in the Electronic Receipt (step 507). The software then applies the One-Way Hash Algorithm identified in the Electronic Receipt to the Electronic Receipt (step 508). A "new" Electronic Receipt Message Digest results (step 509). The software then compares the "new" Message Digest to the Message Digest derived from the decryption of the Encrypted Receipt Message Digest (step 510). If the newly created Message Digest is not identical to the Message Digest derived by decrypting the Encrypted Receipt Message Digest contained in the Consolidated Information File, the software indicates to the Verifying Party that the Electronic Receipt is not validated and has been modified since the time of its creation and the process stops (step 515). If the newly created Message Digest is identical to the decrypted Message Digest derived from the decryption of the Encrypted Receipt Message Digest, the software indicates to the Verifying Party that the Electronic Receipt is validated as not having been modified from the time of its creation (step 512).

Optionally, if at the time of the original transaction, a One-Way Hash Algorithm was applied to the Related Information File in the same manner as described above with respect to the Electronic Receipt, then a process similar to that applied to the Electronic Receipt is applied to the Encrypted Message Digest corresponding to the Related Information File to verify and authenticate the Related Information File.

If the Electronic Receipt and/or Related Information File has (have) been validated and authenticated, a synchronization application on the computer then transfers the Specific Transaction Data and/or the Information in the Information File (or optionally the Electronic Receipt or the Information File in its entirety) to a Purchaser designated software application or location enabling storage, analysis, use and transfers of said Specific Transaction Data and Information (step 513). The Specific Transaction Data and Information are then available for use (for example in Intuit's Quicken or Microsoft's Money personal finance management software packages) or for further transfer (for example, in the context of completion of corporate expense reimbursement request forms, for importation into and submission with a Purchaser expense reimbursement request form).

In one alternative implementation, Purchasers may add electronic annotations directly to the Electronic Receipt or Related Information File in partitioned portions of said files using a means either built in to the Hub 202 or the DTD 203. In the case of a means built into the DTD 203 said means would allow Purchasers to add electronic annotations to Electronic Receipts or Related Information Files using a keyboard such as the one incorporated into Research in Motion's BlackBerry™ Wireless Handheld device (and further described in U.S. Pat. No. 6,611,255 B2 to Griffin et al., incorporated herein by reference in its entirety); a handwriting recognition based capability such as that incorporated into Microsoft's Transcriber 1.5 software or a character set and handwriting recognition system such as the ones described in U.S. Pat. No. 6,493,464 to Hawkins et al. and U.S. Pat. No. 5,889,888 to Marianetti, II, et al., both incorporated herein by reference in their entireties. As yet another alternative, a speech recognition (or speech-to-text) system may be employed, such as for example the IBM Via Voice family of speech recognition software, which allows voice-controlled navigation through various fields within a data file, as well as entry of text or other types of annotations. It will be obvious to one skilled in the art that other methods of digital or analog data entry may be substituted for the methods described above with similar effect and that such other methods are within the scope and spirit of the invention disclosed herein.

Using these or similar methods, Purchasers could add additional Information about the transaction (for example, in the case of a business dinner which will be subsequently submitted as a business expense reimbursement request, the name of the people present at the meal and the business related matters discussed at the meal) to a dedicated data field or fields ("Comment Fields") within the Electronic Receipt, the Related Information File or the Consolidated Information File or all three. The Comment Fields would allow annotation of the Information File without interfering with the verification and authentication features incorporated into the Information File.

Figure 6:
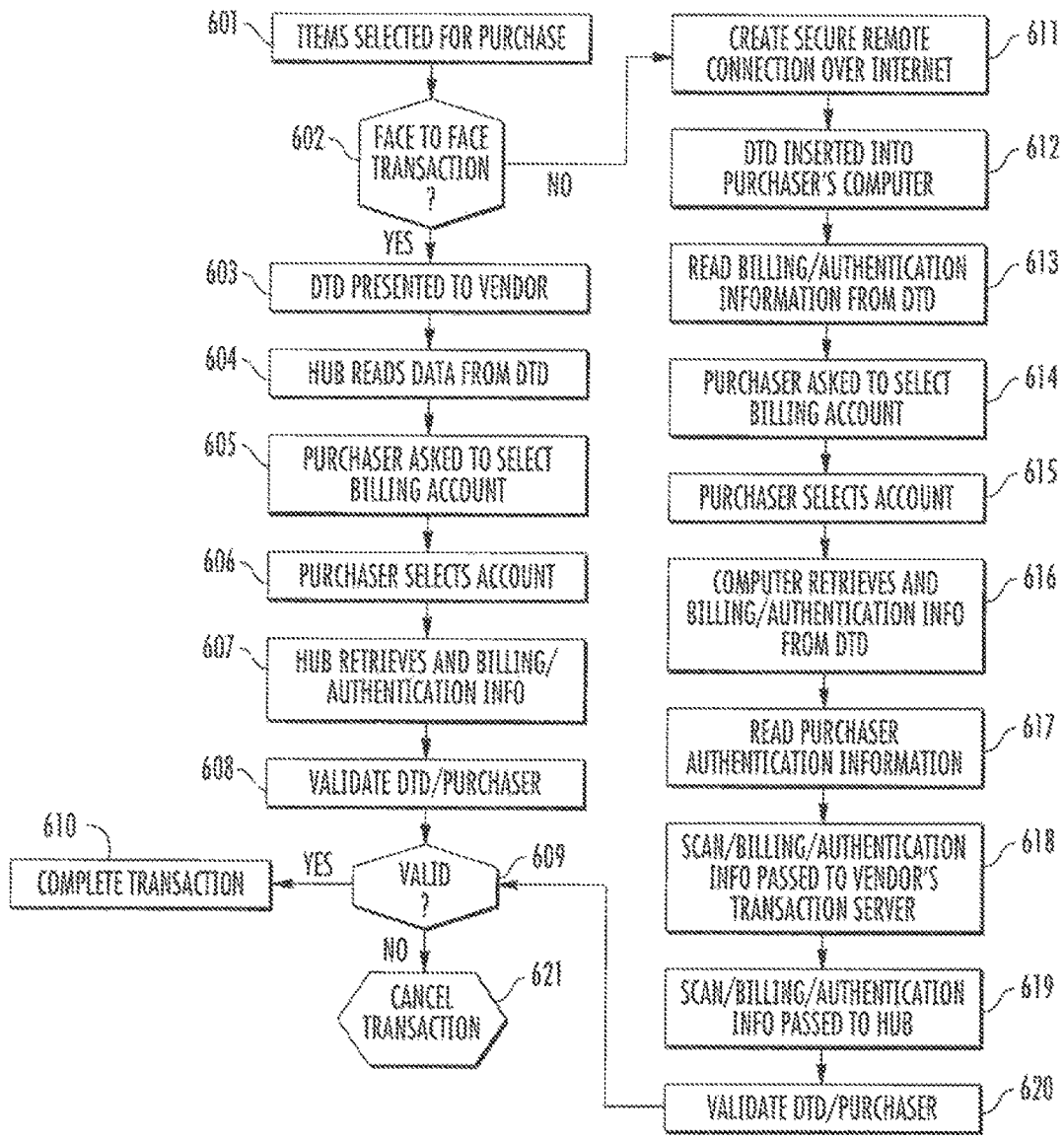
FIG. 6 is a flowchart of an alternate embodiment of the method of providing billing information where the DTD contains billing and Purchaser authentication information corresponding to multiple billing accounts.

FIG. 6 is a logical flowchart showing an alternative embodiment of the invention incorporating the capability to manage information about multiple billing accounts and their corresponding authentication information. In the alternative embodiment billing information relating to multiple Purchaser billing accounts is stored in encrypted form on the DTD 203 along with corresponding authentication information (such as a user personal identification number or numbers or information allowing the system to authenticate the Purchaser's thumbprint) also stored in an encrypted format. Each billing account is identified by a user selectable name that does not include the actual billing account number (for security purposes).

If the transaction is in-person, the DTD 203 is presented to the Vendor (step 603). The Vendor connects the DTD 203 to a Hub 202 either attached to the Vendor's POST 201 or built in to the Vendor's POST (not shown). The Hub 202 reads Purchaser authentication and encrypted billing information (which includes data identifying the thumbprint(s) of the party(ies) authorized to use the DTD 203) stored on the DTD 203 (step 604). A display either built in to the Hub 202 or connected to the Hub 202 (not shown) displays the user selected names for each of the billing account numbers stored on the DTD 203 and asks the Purchaser to select an account for use in the transaction (step 605). After the Purchaser selects a billing account (step 606), the Hub 202 retrieves the billing information corresponding to the selected billing account from the DTD 203 (which includes Purchaser authentication data identifying the thumbprint(s) of the party(ies) authorized to use that billing account) (step 607) and decrypts the Purchaser authentication data stored in the encrypted billing information. The Hub 202 then authenticates the identity of the Purchaser by reading the thumbprint of the Purchaser presenting the DTD 203 by means of a thumbprint scanner present on either the Hub 202 or the DTD 203 and then comparing that data against the decrypted Purchaser authentication data (step 608). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the Hub 202 indicates to the POST 201 that the transaction may proceed, decrypts the billing information and passes the billing information to the POST. The POST then completes the transaction as described in the manner previously described in FIG. 4 beginning with step 409 (step 610). If the Purchaser is not authenticated, the Hub 202 alerts the POST 201 which then cancels the transaction (step 621) or alternatively, asks for an alternate method of payment.

If the transaction is not being conducted in person (for example a transaction conducted over the Internet), the process will be largely the same as described above except: following step 602, the Purchaser establishes a secure connection between their web browser software and the Vendor's transaction server using one of several secure communication standards (such as Secure Socket Layer) that are known in the art (step 611). The Purchaser is then prompted to connect the DTD 302 (whether via wireless or wired connection) to a hardware connection on their computer 301 (step 612). Depending on the specific configuration of the DTD 302, various wired and/or wireless connection standards may be used either singly or in conjunction with additional hardware attached to the Purchaser's computer 301. Software (not shown) on the Purchaser's computer 301 reads encrypted Purchaser authentication and billing information (which includes data identifying the thumbprint(s) of the party(ies) authorized to use the DTD 203) stored on the DTD 302 (step 613). The Purchaser's pre-selected names for each of the billing account numbers stored on the DTD 302 are displayed for the Purchaser and the Purchaser is asked to select an account for use in the transaction (step 614). After the Purchaser selects a billing account (step 615), the Purchaser's computer 301 retrieves the billing information corresponding to the selected billing account from the DTD 302 (which includes Purchaser authentication data identifying the thumbprint(s) of the party(ies) authorized to use that billing account) (step 616) and decrypts the Purchaser authentication data stored in the encrypted billing information. A thumbprint scanner 303 present on the DTD 302 reads the thumbprint of the Purchaser (step 617). The thumbprint scan information and the encrypted billing information (which includes encrypted authentication information including data identifying the characteristics of the authorized billing party's thumbprint) on the DTD 302 are then transferred to the transaction server via the secured connection (step 618). The transaction server then transfers the thumbprint scan information and the billing information to the Hub 202 (step 619). The Hub 202 decrypts the Purchaser authentication data stored in the encrypted billing information and then uses the thumbprint scan information to authenticate the identity of the Purchaser by comparing the thumbprint scan information to the decrypted Purchaser authentication information (step 620). If the thumbprint scan information matches the decrypted Purchaser authentication information, the Purchaser is authenticated. If the thumbprint scan information does not match the decrypted Purchaser authentication information, the Purchaser is not authenticated.

If the Purchaser is authenticated as valid, the Hub 202 indicates to the POST 201 that the transaction may proceed, decrypts the billing information and passes the billing information to the POST. The POST then completes the transaction as described in the mailer previously described in FIG. 4 beginning with step 409 (step 610). If the Purchaser is not authenticated, the Hub 202 alerts the POST 201 which then cancels the transaction (step 621) or alternatively, asks for an alternate method of payment.

Figure 7:
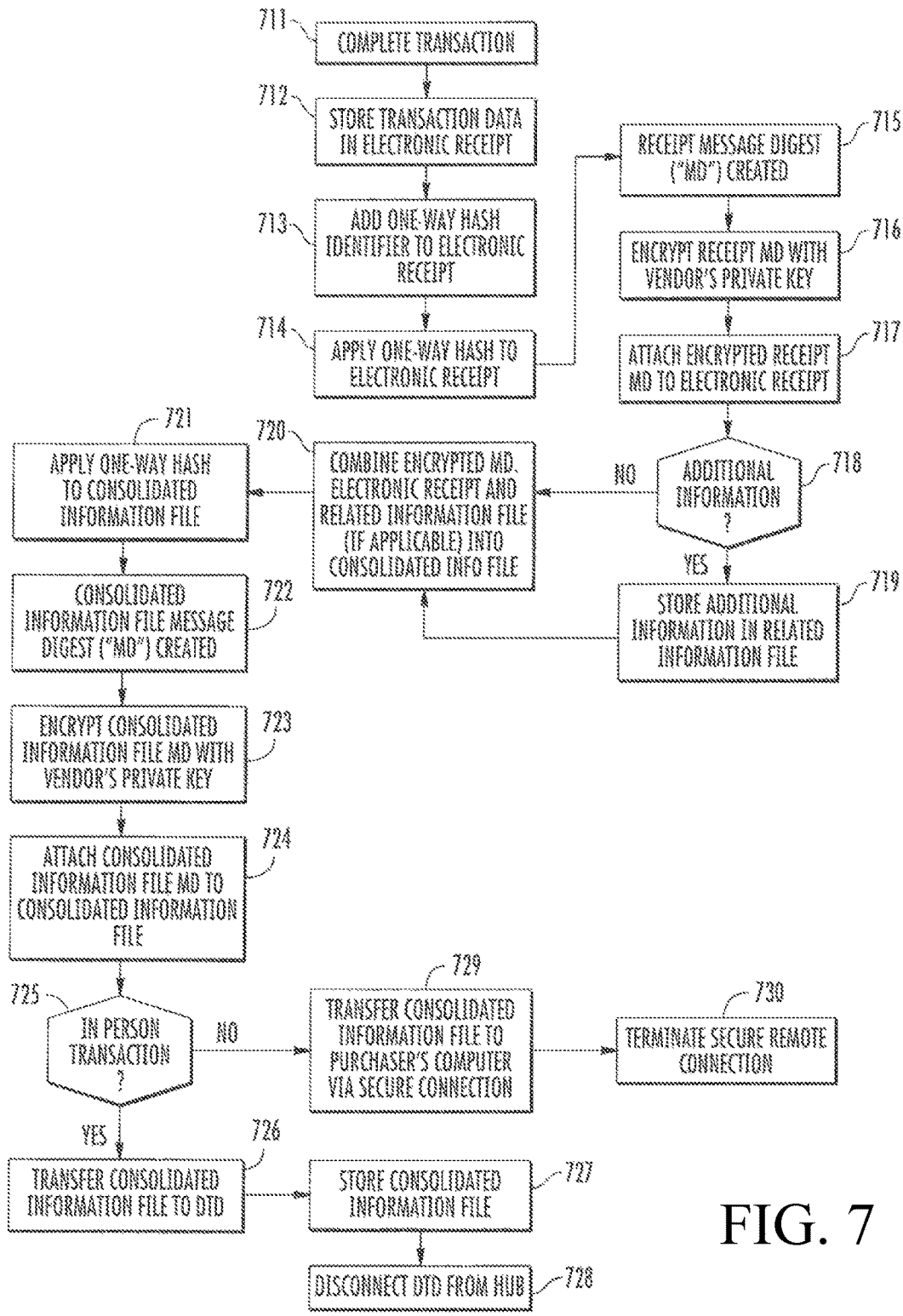
FIG. 7 is a flowchart of an alternate embodiment of the method of verifying the authenticity and integrity of elements within a Consolidated Information File.

FIG. 7 is a flowchart of an alternate method of verifying the authenticity and integrity of elements within a Consolidated Information File. After the steps prior to step 410 on FIG. 4 are completed, the Specific Transaction Data about the transaction, including, optimally, the name of the vendor, the date of the transaction, the list of the items transacted (with individual prices), the subtotal of the transaction, the tax (if applicable), the total of the transaction purchase price, the Vendor's transaction identifier number (if applicable) and a Payment Card transaction reference number (if applicable) is electronically stored in a binary file (the "Electronic Receipt") (step 712). Information identifying the One-Way Hash Algorithm that will be applied to the Electronic Receipt is also stored in the Electronic Receipt (step 713). A One-Way Hash algorithm is then applied to the Electronic Receipt (step 714) yielding a Message Digest that is unique to the Electronic Receipt (step 715). The Electronic Receipt Message Digest is then encrypted using a Private Key belonging to the Vendor (step 716) yielding an Encrypted Electronic Receipt Message Digest that is unique to the specific transaction and Vendor. The Encrypted Electronic Receipt Message Digest is then attached to the Electronic Receipt (step 717). If desired, additional Information indirectly related to the transaction at hand (for example data relating to the Purchaser's participation in the Vendor's loyalty program or in the case of a medical Vendor, updates to the Purchaser's medical record), may also be either included in the Electronic Receipt or stored in a separate, preferably encrypted electronic file (a "Related Information File") or both (step 719). The Encrypted Electronic Receipt Message Digest the Electronic Receipt and the Related Information File (if applicable) are then combined into a binary file or file set (hereinafter be referred to as an "Consolidated Information File") (step 720). A One-Way Hash algorithm is then applied to the Consolidated Information File (step 721) yielding a Message Digest that is unique to the Consolidated Information File (step 722). The Consolidated Information File Message Digest is then encrypted using the same Vendor Private Key that was used to encrypt the Electronic Receipt Message Digest (step 723) yielding an Encrypted Consolidated Information File Message Digest that is unique to the specific transaction and Vendor. The Encrypted Consolidated Information File Message Digest is then attached to the Consolidated Information File (step 724)

If the transaction is being conducted in person, the Consolidated Information File will be transferred from the Hub 201 to the DTD 203 (step 726) where it will be stored as an individual file or checked into a software application or a consolidated data file (for example as a series of entries in a relational database table or tables that are part of an independent distributed database) along with other Consolidated Information Files for secure (encrypted) or non-secure storage (step 727). The DTD 203 can then be disconnected (whether physically or wirelessly connected) from the Hub 202 (step 728).

If the transaction is not being conducted in person, rather than transferring the Consolidated Information File to the DTD 203, the Hub 202 transfers the Consolidated Information File to the transaction server which in turn transfers the Consolidated Information File back to the Purchaser's computer 301 via the secured connection (step 729). The secure connection is then terminated (step 730).

Alternatively, if encryption is not required or desired, after the Specific Transaction Data is stored in the Electronic Receipt (step 712) the Electronic Receipt may be combined with Information (if desired) into a Consolidated Information File (step 720) (omitting steps 713 through 717). In such case, the Consolidated Information File will not contain an Encrypted Electronic Receipt Message Digest. The Consolidated Information File will not be encrypted, but rather will then be transferred from the Hub 201 to the DTD 203 (in the case of an in-person transaction) (step 726) (omitting steps 721 through 724) or to the transaction server for transmission to the Purchaser's computer 301 (in the case of a not in-person transaction) (step 729) (omitting steps 721 through 724).

Figure 8:
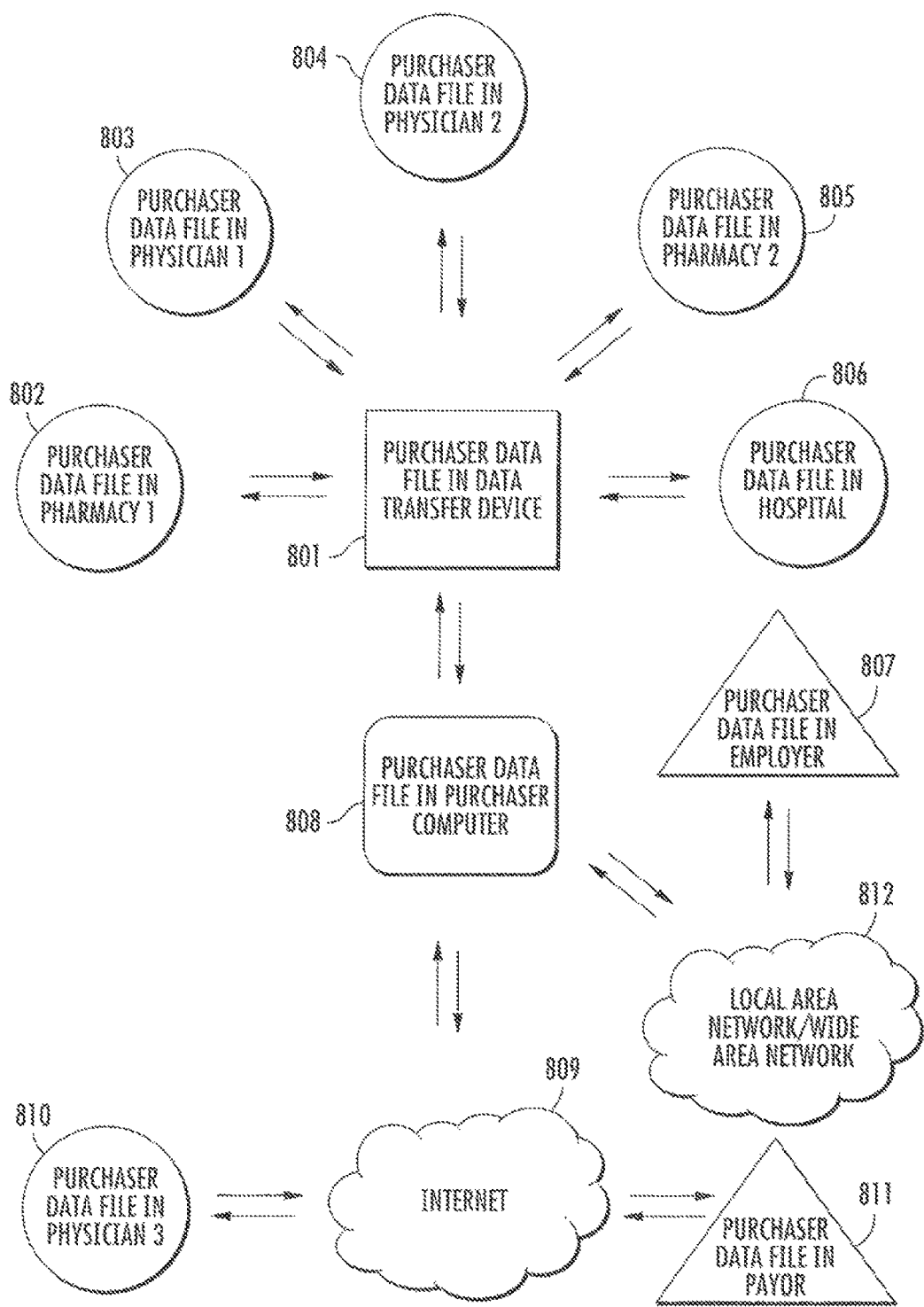
FIG. 8 is a graphical illustration of one embodiment of a method of transferring healthcare data and healthcare related data employing the principles of the present invention.

FIG. 8 is a diagram of an exemplary embodiment of the method of transferring healthcare data and healthcare related data employing the principles taught in the instant invention. Specific Transaction Data and Information is exchanged between a Purchaser and its various healthcare Vendors as well as other authorized users of the data (in this example, the Purchaser's employer and the healthcare insurance company paying the Vendors for the healthcare services). At such times as the Purchaser may choose, the Purchaser's distributed database Data File on a Data Transfer Device (801) can be synchronized with Purchaser's distributed database Data File hosted by Purchaser's Pharmacy #1 (802), Purchaser's distributed database Data File hosted by Purchaser's Physician #1 (803), Purchaser's distributed database Data File hosted by Purchaser's Physician #2 (804), Purchaser's distributed database Data File hosted by Purchaser's Pharmacy #2, and/or Purchaser's distributed database Data File hosted by Purchaser's Hospital (806). In each case, synchronization of the distributed database Data File on the Data Transfer Device (801) and the distributed database Data File that is hosted by the Vendor in question is initiated by connecting the Purchaser's Data Transfer Device (not shown) via wired or wireless means to either a computer hosting the Vendor's version of Purchaser's Data File or a Hub (not shown) connected to a computer hosting the Vendor's version of Purchaser's Data File (not shown).

After the Data Transfer Device is connected to either the Vendor's computer or the Hub, software resident on either the Data Transfer Device, the Vendor's computer or the Hub manages synchronization of the Data File on the Data Transfer Device (801) with the Data File on the applicable Vendor's computer. The Data Transfer Device is then disconnected from the Vendor's computer or the Hub.

At a later time, the Data Transfer Device is connected to the Purchaser's computer (not shown). At that time, software resident on either the Data Transfer Device or the Purchaser's computer manages synchronization of the Data File on the Data Transfer Device (801) with the Data file on the Purchaser's computer (808). The Purchaser's Data File can also be synchronized via a Local Area Network or Wide Area Network connection (812) to a remote computer on which a distributed database Data File is being hosted (807).

Alternatively, synchronization files can be created from a Vendor's distributed database and emailed to a Purchaser (or alternatively from a Purchaser's distributed database and emailed to a Vendor) in order to allow the Purchaser to use software resident on their computer to synchronize their Data File with the Vendor's emailed synchronization file. As required, the Data File on the Data Transfer Device (801) or the synchronization files created from distributed database Data Files can be processed using the methods taught herein to provide users with the ability to authenticate and verify the information in said File or files.

Multi-Dimensional Bar Code

As used herein, the term "data processing device" will be understood to include any device capable of processing digital data, including, inter alia, personal computers (PCs), whether desktop, laptop, or otherwise, PDAs such as the well-known "Palm™" series manufactured by Palm Corporation, so-called "hand-held" PCs such as the HPW-600ET "eplate" incorporating Microsoft Windows CE manufactured by Hitachi Corporation, cellular telephones, and "smart" pagers. Also included within the scope of the term "data processing device" are such devices as network servers, minicomputers (including, for example the SPARC series of minicomputers manufactured by Sun Microsystems Corporation), and any other non-personal computing device.

As described in greater detail below, one embodiment of the present invention comprises an interface to a data network having at least two different nodes and at least one server each operatively connected to the Internet, although it will be appreciated that other configurations having more or less nodes, architectures, and/or servers may be employed consistent with the invention. Hence, the term "computer network" as used herein may include, but is not limited to, local-area networks (LAN), wide-area networks (WAN), intranets, the Internet, and may utilize any topology, protocol, or physical medium for communication including Ethernet, X.25, token ring, frame relay, ATM, SONET. Hence, as used herein, the term "computer network" is meant in its broadest sense to include any type of network capable of transmitting digital data between users.

Figure 9:
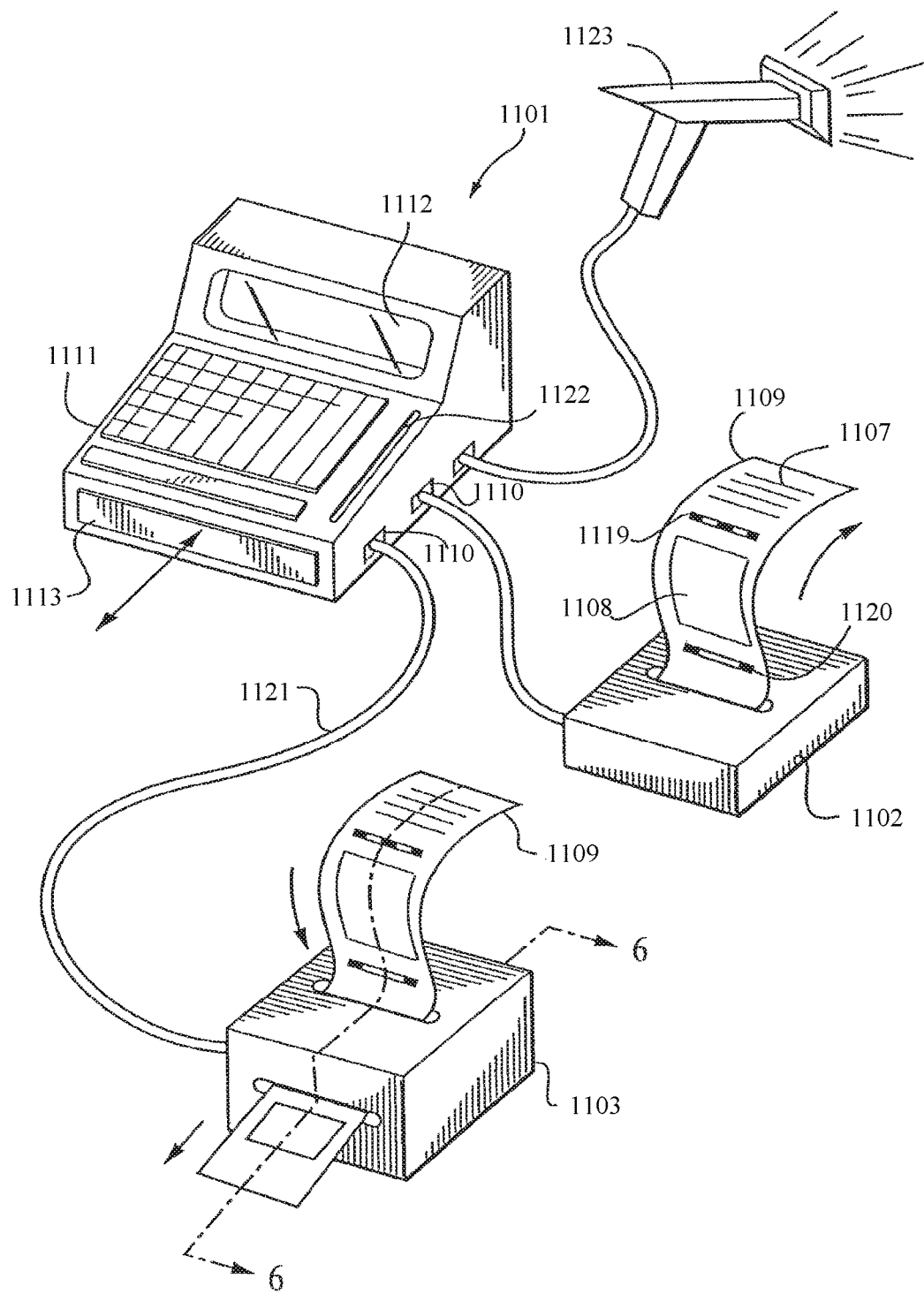
FIG. 9 is a perspective view of one exemplary embodiment of the transaction data encoding and decoding system of the present invention.
Figure 10:
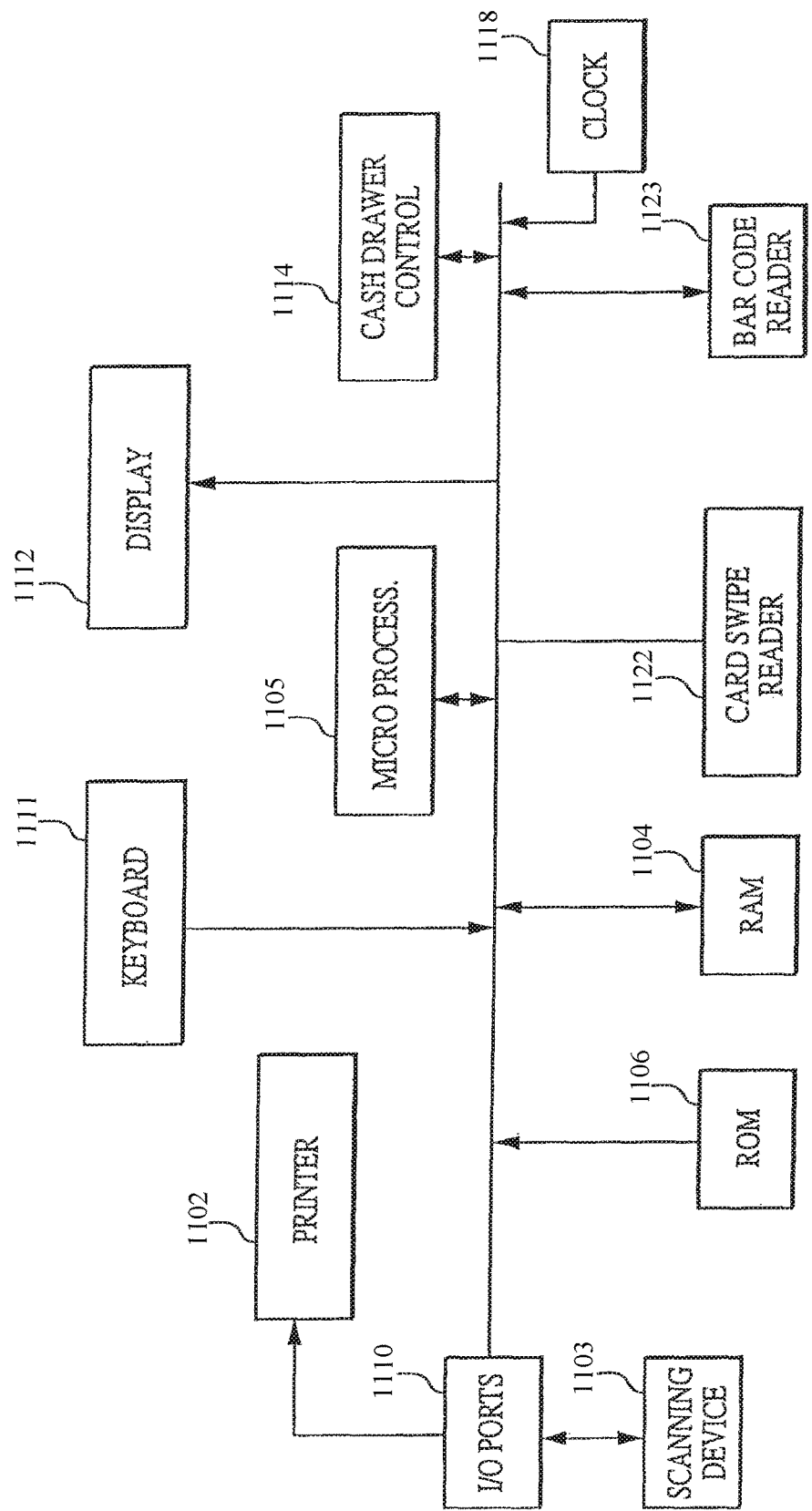
FIG. 10 is a logical block diagram of the transaction data encoding and decoding system of FIG. 9.

Referring now to FIG. 9 and FIG. 10, one exemplary embodiment of the transaction data encoding system 1100 of the invention is described. A cash register 1101 is connected to an electro-optical scanning device 1103 capable of reading a dataform 1115 and a printer 1102 having sufficient print resolution to print a receipt 1109 containing, inter alia, a human readable information set 1107, a machine readable dataform 1108, a designated area for handwritten notations 1304, an "attention" symbol 1119 and an "endsearch" symbol 1120. The cash register 1101 incorporates, among other equipment, a random access memory ("RAM") 1104, a microprocessor 1105, a read only memory ("ROM") 1106, input-output data ports ("I/O Ports") 1110, a keyboard 1111, a display 1112, a cash drawer 1113 controlled by a cash drawer control 1114, a clock 1118 and a card swipe reader 1122. The construction and operation of microprocessor-based cash registers having the aforementioned components is well understood, and accordingly is not described further herein. In the embodiment of FIG. 9, the cash register 1101, the scanning device 1103 and the printer 1102 are linked by serial connections 1121, although it will be recognized that other types of data connections including parallel connections, IEEE-1394 "Firewire", or even infrared or wireless interfaces may be substituted. Furthermore, while the scanning device 1103 and printer 1102 are external to the cash register 1101 in the illustrated embodiment, two or more of such components may in fact be physically integrated into one device.

At the time of the transaction, by means of a keyboard 1111, a card swipe reader 1122, a bar code reader 1123 or other data entry device, a vendor enters transaction information such as, for example: (i) a brief description of each good or service being transacted (including, if required, the product identification number assigned to each good or service transacted); (ii) a numerical value reflecting the number of each type of good or service being transacted; (iii) a numerical value reflecting the price for each good or service being transacted; (iv) a numerical value reflecting the subtotal of the goods or services being transacted; (v) a numerical value reflecting the sales tax amount, if applicable, on the goods and services being transacted; (vi) a numerical value reflecting the total amount of the transaction; (vii) a description of the method of payment made by the purchaser; and/or (viii) a unique transaction record locator number, providing a reference for retrieval of the transaction data from the vendor's database.

If the purchaser pays for the purchase with a credit card or debit card, or if the vendor employs a check verification service, additional transaction information will be included such as, for example a purchaser's credit/debit card (account) number, the expiration date of the credit/debit card, and/or an authorization code provided by the credit card company, check verification company or other authorizing financial institution for authorization of transactions against the account.

Additional vendor required information is also passed to the RAM 1104. As each piece of transaction information is either entered by the vendor or received from a data source, a computer program stored on the ROM 1106 and/or RAM 1104 and executed on the microprocessor 105 coordinates the vendor's entry of transaction information so that each piece of information is characterized according to a pre-defined set of categories such as, for example: Item Identification Information; Unit Price; Subtotal Price; Sales Tax; Total Price; Card Number; Expiration Date; Authorization Code; Vendor Name; Vendor Address; Vendor Telephone Number; Transaction Date; Transaction Time and Vendor Database Record Locator. The characterization of the information is either determined by the order in which it is entered (i.e. the system expects that the first piece of data entered will be the Item Identification Information, the second piece of data the Unit Price and so on) or the user is prompted to enter the data in a certain sequence (i.e. the prompt "Unit Price?" is displayed and then the data entered in response is characterized as Unit Price data, etc.).

Based on these characterizations, an algorithm stored on the ROM 1106 or RAM 1104 assigns the discrete pieces of transaction information to designated temporary locations in the RAM 1104 that correspond to the various characterization categories.

The microprocessor 1105 in the cash register 1101 executing software stored in the ROM 1106 or RAM 1104, creates a transaction dataset (not shown) by combining all of the transaction information stored in the RAM 1104 and the associated characterization information. Note that for any vendor-purchaser transaction, only transaction information corresponding to one discrete transaction is encoded into each transaction dataset. The microprocessor 1105 then executes software stored in the ROM 1106 or RAM 1104 incorporating dataform encoding algorithms (referenced below) and encodes the transaction dataset (not shown) into a dataform pattern 1108.

There are a number of dataform encoding symbologies well known to those skilled in the art that can be used to encode the transaction dataset consistent with the present invention. Examples of encoding symbologies include, but are not limited to, the well-known "Code One," "DataMatrix," "MaxiCode," "PDF417" (disclosed in U.S. Pat. No. 5,304,786), "ArrayTag" (disclosed in U.S. Pat. No. 5,202,552) and "Aztec" (disclosed in U.S. Pat. No. 5,591,956) formats, each of the foregoing being incorporated herein by reference in its entirety. One skilled in the art could readily envision how these and other data entry methodologies could be employed to similar effect.

The dataform pattern 1108, along with the human readable version of the transaction dataset 1107, is converted into printing instructions by a print driver program executed by the microprocessor 1105. The printing instructions are then passed on to the printer 1102. The printer 1102 prints the human readable information 1107, the dataform pattern 1108, and optionally the attention symbol 1119 and the endsearch symbol 1120 onto the receipt 1109. The printer also utilizes printing instructions stored on the ROM 1106 (or RAM 1104) to mark one or more areas 1304 on the receipt 1109 for entry of handwritten notations by the purchaser.

If the size of the transaction dataset exceeds the memory storage capacity of the dataform 1108, the algorithm will include a reference to a second dataform and will partition the additional information into a second dataform. In this example, the transaction data is concatenated, thereby allowing the system to join the data from the two dataform patterns back together into one transaction set.

If the transaction involves a return of merchandise by the purchaser to the vendor, the scanning device 1103 is used by the vendor to read the dataform 1115 from a prior transaction receipt 1116 to obtain the relevant transaction information about the prior transaction. This information includes, but is not limited to, the vendor's database record locator number (s) of the transaction(s) and the product identification number(s) of the transaction item(s) being refunded. This information can be used by the vendor to facilitate the return transaction. In one embodiment, the dataform read by the scanning device comprises all or substantially all of the relevant transaction information, such that no further information access is required. This approach has obvious appeal in terms of reduced data processing and access times. In another embodiment, the dataform comprises a transaction reference identification code which is used by the scanning device (and associated cash register 1101) to access a transaction record stored either locally or remotely from the register in a secure database. This latter embodiment is useful in terms of, inter alia, enhanced security, since surreptitious reading and decoding of the dataform (such as if someone other than the purchaser gains access to the receipt) to obtain sensitive information such as the purchaser's credit card number and expiration date is frustrated. Specifically, if the dataform contains only "coded" information (such as the aforementioned transaction identification code), decoding of the dataform will only yield this same information. However, when an authorized scanning device (e.g., one having access to the secure database record to which the transaction identification code) reads the dataform, it is able to access the sensitive information.

As an alternative to the printer 1102 and printed dataform previously described, the invention may use a magnetically permeable material for encoding of the dataform. For example, a magnetic "write" head of the type well known in the art (not shown) may be used to encode data onto a magnetically permeable substrate such as that of a magnetic stripe disposed on a card. Rather than (or in addition to) printing a paper receipt, the magnetic head may be used to encode the transaction data onto a card with magnetic stripe which the purchaser carries. In a fashion analogous to credit card swiping of the prior art, the magnetic head encodes data onto the stripe of the purchaser's card for later reading and use. Such an approach has the advantage of storing all such data in one location, in that one card could contain a plurality of dataforms. When the user swipes that same card through a reader (described below), all such dataforms would be read, decoded, and the information contained therein stored at appropriate locations in the database.

Figure 11:
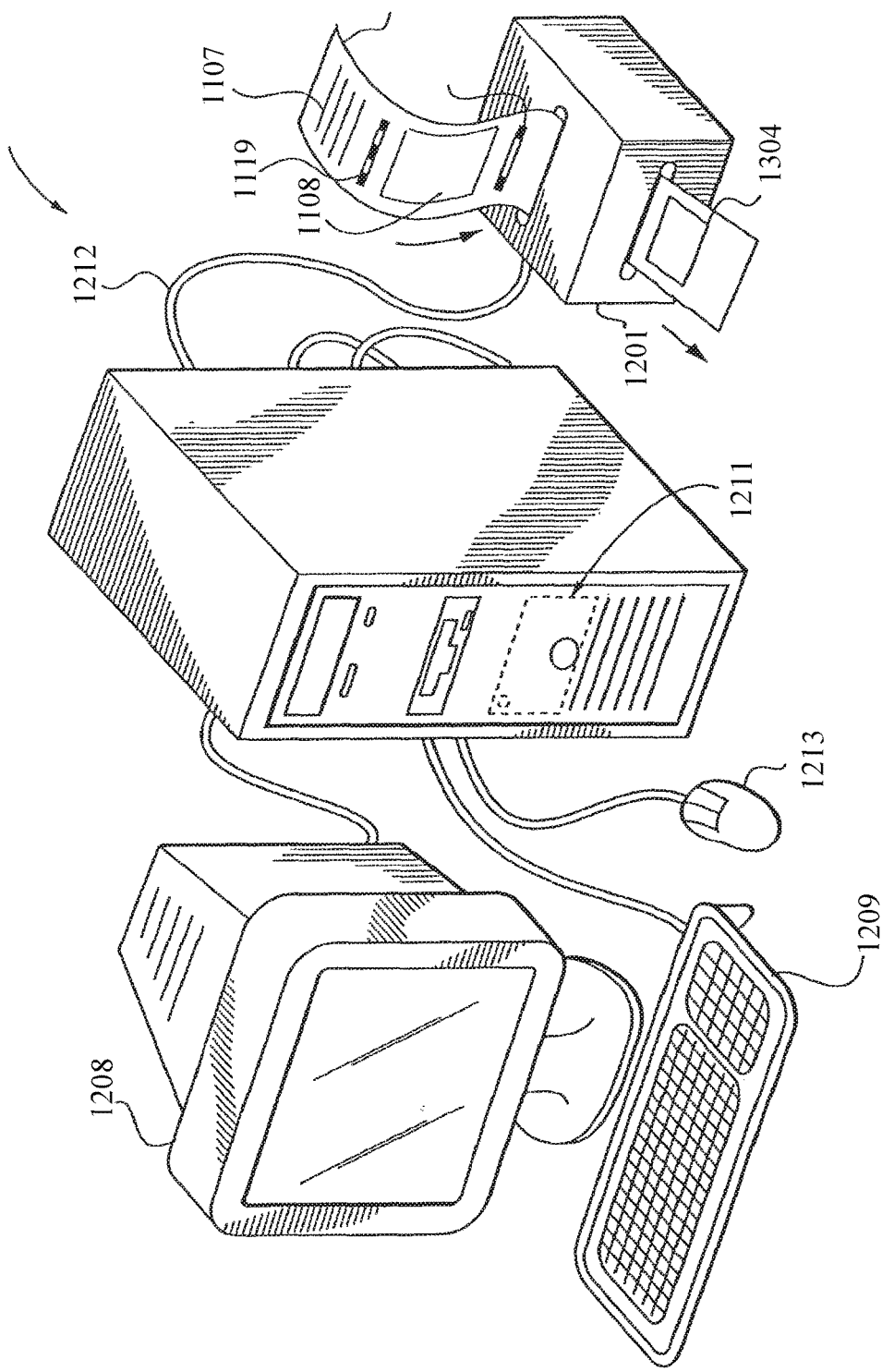
FIG. 11 is perspective view of one exemplary embodiment of the transaction data reading and decoding apparatus of the present invention.

Referring now to FIG. 11, one exemplary embodiment of the system for reading dataforms and other data from the receipt is described. In the embodiment of FIG. 11, a scanning device 1103 capable of reading a dataform 1108 is connected to a data processing device 1202. The data processing device 1202 of the present embodiment is a personal computer which incorporates equipment including a ROM 1205, a RAM 1206, I/O Ports 1207, a display 1208, a keyboard 1209, a microprocessor 1210, a hard drive 1211 and a mouse 1213, as is well known in the computer arts. The computer 1202 and the scanning device 103 are connected by a serial connection 1212, although other types of connections and interfaces may be substituted as previously described herein. A receipt 1109 optionally contains a variety of information including human readable transaction data 1107, a dataform 1108, an attention symbol 1119 and an endsearch symbol 1120. The receipt 1109 may also contain handwritten notations 1304.

Figure 16:
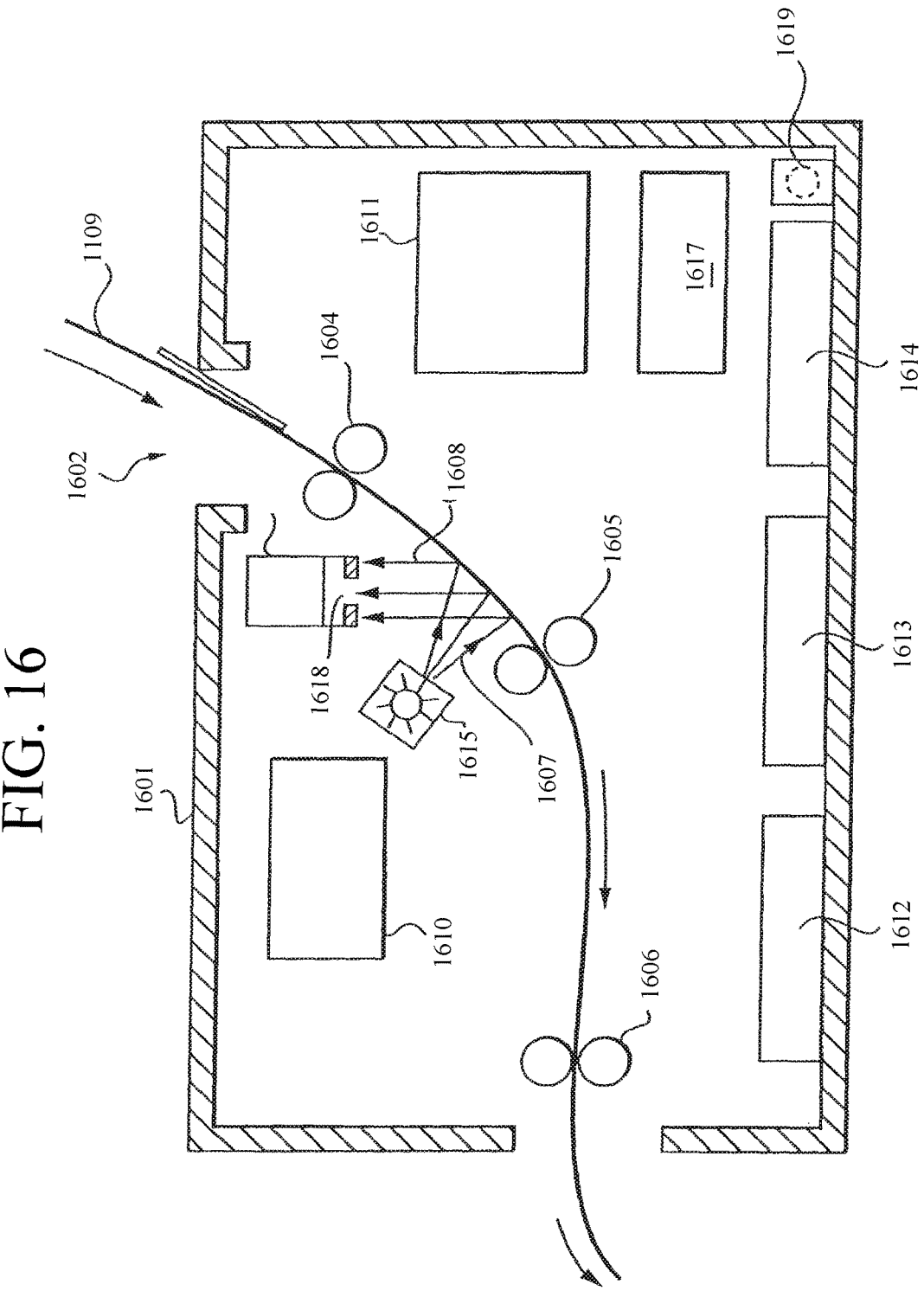
FIG. 16 is a cross-sectional view of the scanning device (103) of FIG. 9 taken along line 6-6, illustrating the various internal components thereof.

One exemplary configuration of the scanning device 1103 used to read the dataform 1108 is described in detail herein with reference to FIG. 16. While the embodiment of FIG. 16 is used as the basis for the following discussion of the scanning methodology of the invention, it will be appreciated that other scanning devices, such as those described in, among other references, U.S. Pat. No. 4,251,798 (Swartz, et al.); U.S. Pat. No. 4,360,798 (Swartz, et al.); U.S. Pat. No. 4,369,361 (Swartz, et al.); U.S. Pat. No. 4,387,297 (Swartz, et al.); U.S. Pat. No. 4,409,470 (Shepard, et al.); U.S. Pat. No. 4,460,120 (Shepard, et al.); U.S. Pat. No. 5,319,181 (Shellhammer, et al.); U.S. Pat. No. 5,331,176 (Sant' Anselmo, et al.) and U.S. Pat. No. 5,773,806 (Longacre, et al.), may be used with equal success. Each of the foregoing U.S. patents is incorporated herein by reference in its entirety.

To scan a receipt, the receipt 1109 is inserted face up into the scanning device 1103. Internal rollers advance the receipt 1109 through the scanning device 1103. This provides the scanning device with positive control over the movement of the receipt 1109 while it is being scanned, allowing the scanning device to control the orientation and location of the dataform 1108.

A light source within the scanning device 1103 projects a beam of light onto the receipt 1109. The light is reflected by the light and dark colored elements of the dataform 1108 to a photodiode detector array in the scanning device. An aperture (not shown) between the photodiode detector array and the reflected light limits the light received by the photodiode detector array to reflected light from a specific area of the scanned receipt. This is the entire field of imagery analyzed by the photodiode detector array at any one moment in time (the "Scanned Field"). The aperture is shaped so that it provides a linear Scanned Field of a width at least equal to the width of the dataform 1108. The receipt 1109 is advanced through the scanning device 1103, causing the dataform 1108 to move through the Scanned Field. As the dataform 1108 moves through the Scanned Field, the photodiode detector array sequentially reads light reflected from the portion of the dataform 1108 passing through the Scanned Field. The reflected light varies in proportion to the reflectivity of the specific portion of the dataform 1108 illuminated in the Scanned Field. The dataform 1108 pattern's dark colored elements reflect less light than the light colored elements. The instantaneous electrical output of the photodiode detector array at any one moment in time represents the localized reflectivity of the portion of the dataform 1108 in the Scanned Field. The signal is passed to a signal amplifier. The signal amplifier boosts the signal and sends it to an analog/digital converter which converts the current into a digitized signal. As the dataform 1108 moves through the Scanned Field, the digitized signals are stored as successive lines of imagery data in a RAM (not shown). The stored data is then analyzed using a digital signal processor to derive the dataform 1108 pattern. The derived dataform 1108 symbology is then identified and the appropriate decoding methodology is applied to decode the dataform 1108 and derive the transaction data including the transaction data characterization information. The characterization data is used to assign the discrete pieces of decoded transaction data to memory storage locations in the RAM 1206 corresponding to the predefined categories previously described with reference to FIG. 9. The received transaction dataset is then passed through the serial connection 1212 to the computer 1202 and mapped to a database on the computer 1202 where the transaction data is available for analysis by other software applications.

Note that attention symbol 1119 printed on the receipt 1109 immediately above the dataform 1108 cues the scanning device 1103 to the presence and relative location of the dataform 1108. After the attention symbol 1119 is scanned and recognized, the scanning device software begins analyzing the scanned input for the dataform 1108 pattern (the "dataform Input Phase"). As the process of searching for, storing and analyzing the dataform 1108 imagery is memory and microprocessor intensive, the attention symbol allows the scanning device to minimize the amount of time devoted to searching for the dataform 1108 in the scanned imagery data. The endsearch symbol 1120 cues the scanning device 1103 to stop the dataform Input Phase, similarly conserving system resources.

Other methods of image scanning, including vision-based scanning employing charge-coupled devices ("CCDs"), are well known to those skilled in the art. Accordingly, one skilled in the art can readily see that the scanning device 1103 described is only one example of several types of scanning devices which could be so employed.

As previously described, the transaction receipt 1109 also optionally contains a human readable version of the transaction information 1107. In another aspect, the scanning device 103 can be used to scan the purchaser's handwritten notations in the designated area 1304 of the receipt 1109, convert the scanned imagery into digital information, store the data in memory and analyze it using optical character recognition (OCR) algorithms to convert the notations to text. The text is then stored in a predefined memory storage location as comments associated with the transaction data read from the annotated receipt. Alternatively, a second algorithm is used to compare words within the identified text against a preset list of words, thereby allowing certain preset or user defined words to signal the system to characterize the associated transaction data as belonging to either a user defined or predefined category or transactions. For example, if a purchaser annotates a receipt to include the words "home office" in the designated field of the receipt, the OCR algorithms recognize and convert the handwritten notations to textual characters (e.g., ASCII). A second algorithm is used to identify coding within the converted text which corresponds to the classification "home office", and store the associated decoded transaction data at a prescribed memory location associated with home office entries.

Figure 13:
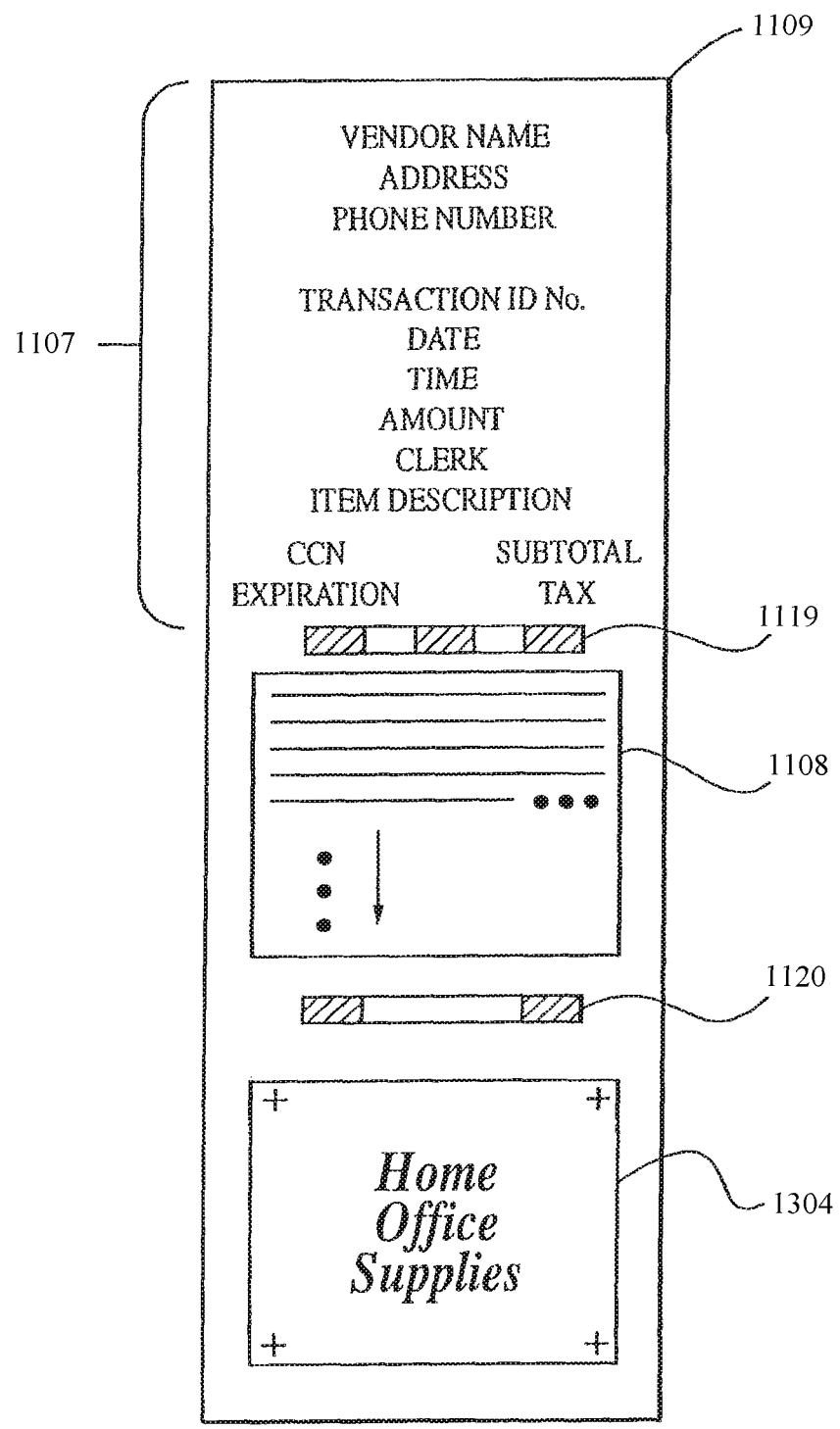
FIG. 13 is a plan view showing one exemplary configuration of a receipt incorporating human and scanning device readable versions of the transaction data.

FIG. 13 illustrates an exemplary layout for a receipt 1109. The receipt 1109 includes a human readable version 1302 of the transaction dataset and a machine readable dataform 1108 containing the transaction dataset and provides an area 1304 in which purchasers may record additional information regarding the transaction. The human readable version 1302 of the transaction data may optionally include the purchaser's credit card number 1305. If such information is included in the receipt 1109, optionally, some numbers of the purchaser's credit card number 1305 may optionally be replaced with null numbers to enhance security by preventing the numbers from being read from the receipt without the aid of dataform reading equipment. An attention symbol 1119 appears above the dataform 1108. An endsearch symbol 1120 appears below the dataform 1108.

The attention symbol 1119 is located above the dataform 1108 on the receipt 1109. It is positioned above the dataform and configured so that it cues the scanning device to employ algorithms to search the scanned imagery data that follows for the dataform. The endsearch symbol 1120 is located below the dataform 1108 on the receipt 1109. It is positioned below the dataform and configured so that it cues the scanning device to stop searching the scanned imagery data for the dataform. Note that because the attention 1119 and endsearch 1120 symbols are of different patterns, the order that they are imaged by the scanning device indicates the orientation of the Receipt 1109 and the dataform 1108.

In one embodiment, the attention symbol 1119 is formed by three solid, evenly spaced dark colored vertical bars of predefined dimensions. The vertically and horizontally consistent elements of the attention symbol 1119 signal software executed on the scanning device microprocessor that the dataform 1108 pattern follows immediately after the attention symbol 1119. Upon receiving this signal, the scanning device employs an algorithm to analyze the incoming scanning signal for known dataform patterns. One skilled in the art can readily see that other patterns employing structures that are similarly consistent could be employed to similar effect.

Also note that while the purchaser's credit card number 1305 is fully encoded within the dataform 1108, in the human readable version 1302 of the transaction data printed on the receipt 1109, only the first four numbers of the purchaser's credit card number are printed. All remaining digits of the credit card number are replaced with an "X" or similar null characters, thereby preventing a casual viewer from reading the purchaser's credit card number from the receipt 1109.

Figure 14:
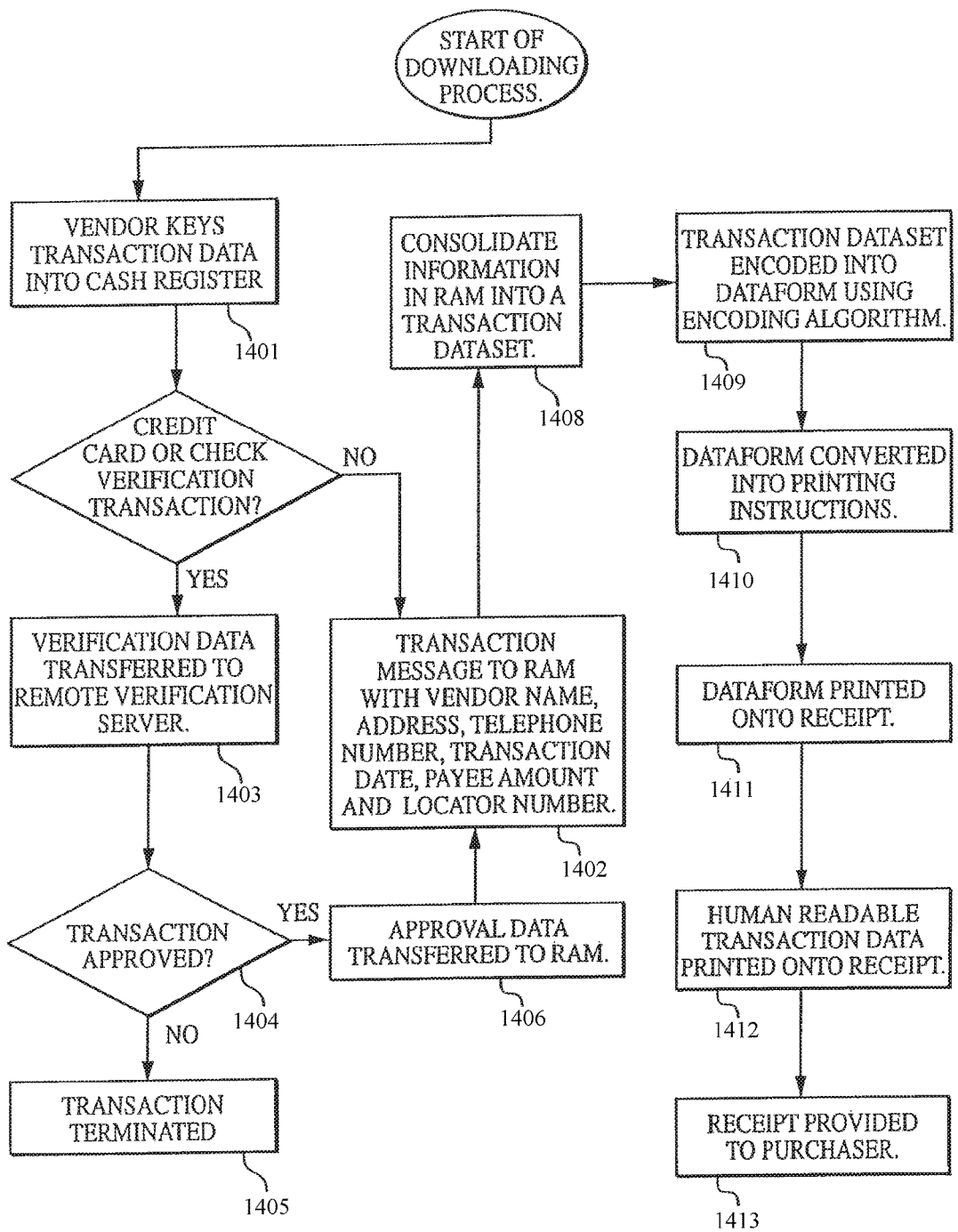
FIG. 14 is a logical flow chart illustrating one embodiment of the data encoding process of the present invention.

FIG. 14 is a logical flowchart showing one embodiment of the method of encoding transaction data using the system of FIG. 9. First, the vendor enters the transaction data into a cash register (step 1401). If the transaction does not involve a credit card or check verification, the transaction information is passed to the RAM (step 1402). If the transaction involves a credit card or check verification, the information is sent to a remote verification server (step 1403) for approval. If the transaction is not approved (step 1404), it is terminated (step 1405). If the transaction is approved, the approval data is transferred to the RAM (step 1406) along with the transaction information (step 1402). Algorithms executed on the cash register microprocessor characterize the transaction data using preset categories and based on those characterizations, store the transaction data in designated locations in memory (step 1407). The characterized transaction data is then consolidated into a transaction dataset (step 1408). The transaction dataset is then encoded into a dataform (step 1409). The dataform is then converted into printing instructions (step 1410) and printed onto the receipt (step 1411). A human readable version of the transaction data is also printed onto the receipt (step 1412). The receipt is then provided to the purchaser (step 1413).

Figure 12:
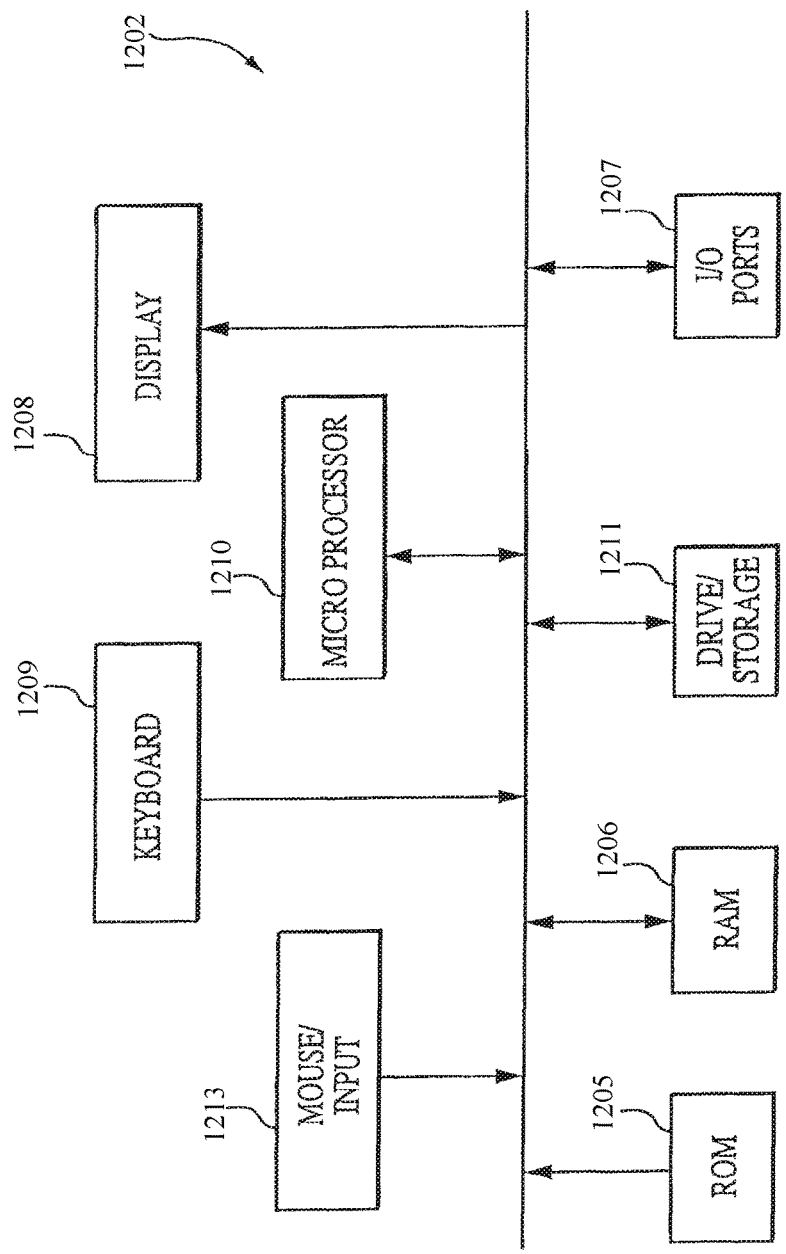
FIG. 12 is logical block diagram of the transaction data reading and decoding apparatus of FIG. 11.
Figure 15:
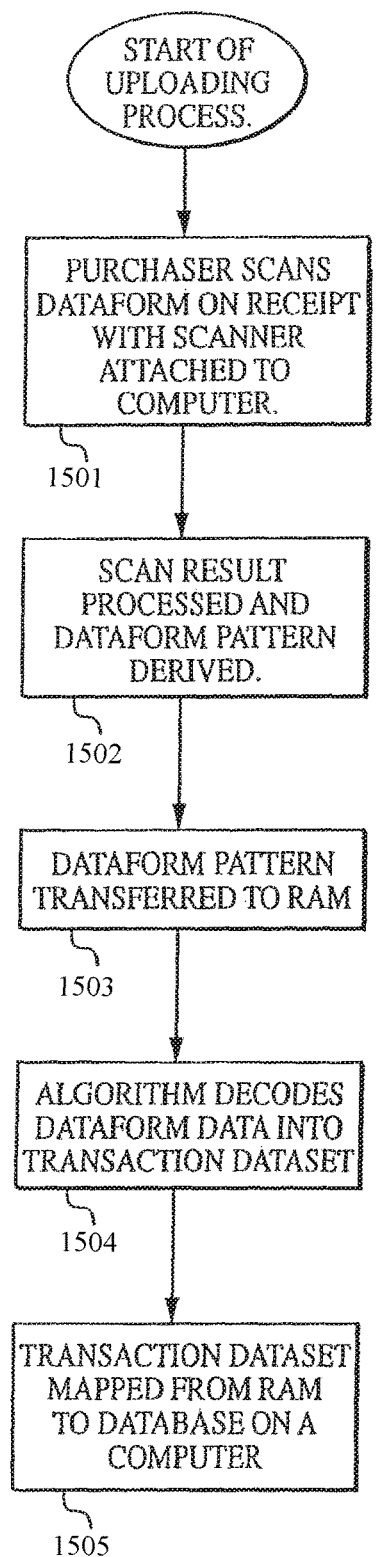
FIG. 15 is a logical flow chart illustrating one embodiment of the data reading/decoding process of the present invention.

FIG. 15 is a logical flowchart showing one embodiment of the method of reading and decoding encoded transaction data, using the system of FIG. 12. The purchaser scans the dataform using a scanning device attached to a computer (step 1501). The scanned image data is digitized and processed to derive the dataform pattern (step 1502). The dataform is transferred to the RAM (step 1503). An algorithm executed on the microprocessor decodes the dataform to derive the transaction dataset (step 1504). Using the characterization information encoded in the transaction dataset, the categorized transaction data is mapped from the RAM into memory locations in a computer corresponding to the categories of the transaction data (step 1505).

FIG. 16 illustrates one exemplary configuration 1601 for a dedicated receipt scanning device 1103. The scanning device 1601 contains a microprocessor 1612, a RAM 1613, a digital signal processor 1617 and a ROM 1614 and incorporates a receipt feed slot 1602 into which a receipt 1109 is inserted face up. Movement of the receipt 1109 within the scanning device 1601 is controlled by means of feed/drive rollers 1604, 1605, 1606. The scanning device 1601 incorporates a light source 1615 projecting an illuminating beam 1607 onto the receipt 1109. The light source may be a coherent source (e.g. LASER), or alternatively a broad spectrum source such as an incandescent lamp. The reflected light 1608 from the illuminating beam 1607 is passed through an aperture 1618 and detected by a photo-diode detector array 1609 connected to a signal amplifier 1610 which is in turn connected to an analog to digital converter (ADC) 1611. The scanning device 1601 is connected to a computer (not shown) through a serial connection 1619, although other types of connection may be used as previously described.

The user inserts the receipt 1109, oriented face up, in the receipt feed slot 1602 until it is engaged by the first feed/drive roller 1604. The side walls of the receipt feed slot 1602 guide the receipt towards the first feed/drive roller 1604. The feed/drive roller 1604 advances the receipt through the scanning device 1601 until the dataform 1108 on the receipt 1109 is illuminated by the illuminating beam 1607 projected by the light source 1615. The illuminating beam 1607 is reflected by the light and dark areas of the dataform to the photodiode detector array 1609. The light and dark portions of the dataform reflect different amounts of light resulting in variations in the reflected light 1608. The reflected light 1608 is detected by the photodiode detector array 1609. The aperture 1618 between the reflected light 1608 and the photodiode detector array 1609 limits the reflected light 1608 received by the photodiode detector array 1609 to light reflected from a specific area of the scanned receipt and creates a scanned field which is the entire field of imagery analyzed by the photodiode detector array 1609 at any one moment in time. The aperture 1618 is shaped so that it provides a linear scanned field of a width at least equal to the width of the dataform. In response to the reflected light 1608, the photodiode detector array 1609 generates a small electrical current that varies in proportion to the amount of reflected light 1608 detected. This current is passed to the signal amplifier 1610 which amplifies the electrical signals generated by the photodiode detector array 1609 and passes the amplified signal to the A/D Converter 1611. The A/D Converter 1611 converts the electrical signals into digital samples which are stored in successive memory locations in the RAM 1614. The feed/drive rollers 1604, 1605, 606 are controlled by the microprocessor 1612 and advance the receipt 1109 past the illuminating beam 1607 allowing the entire dataform 108 to be scanned. The microprocessor 1612 executes algorithms stored in the ROM 1613 to analyze the signal received by the A/D Converter 1611 and to identify and differentiate between scanned dataform imagery and other non-dataform imagery. After the entire dataform is scanned by the photodiode detector array 609, the digital signal processor 1617 analyzes the stored digital samples in the RAM 1614, determines the dataform pattern from the stored digital samples, identifies the symbology of the dataform and applies the appropriate decoding algorithm to decode the dataform, revealing the transaction dataset and the associated transaction data characterization information. Using the characterization information, software stored on the ROM 1613 and executed by the microprocessor 1612 stores the transaction data memory address locations in the RAM 1614 which are pre-designated to correspond to predetermined characterization categories. The microprocessor 1612 then employs an algorithm stored on the ROM 1613 to map the transaction data from the RAM 1614 through the serial connection 1619 to a database on the computer where the transaction data is available for analysis by other software applications.

It will be recognized that while the embodiment of FIG. 16 utilizes varying degrees of reflectivity of the dataform in order to encode/decode data, other approaches may conceivably be used with the present invention. For example, the dataform may be rendered in terms of materials of varying light absorption at prescribed wavelengths. Alternatively, fluorescent or phosphorescent materials could be used to form or coat portions of the dataform, such materials varying in the strength and/or wavelength of light emitted in response to a stimulating light source in contrast to other portions of the dataform not so coated. Magnetically permeable coatings may be used, as previously described, such that no light source is used, but rather a magnetic read/write head of the type well known in the art. Many other such alternatives are possible, all considered to be within the scope of the invention claimed herein.

Figure 17:
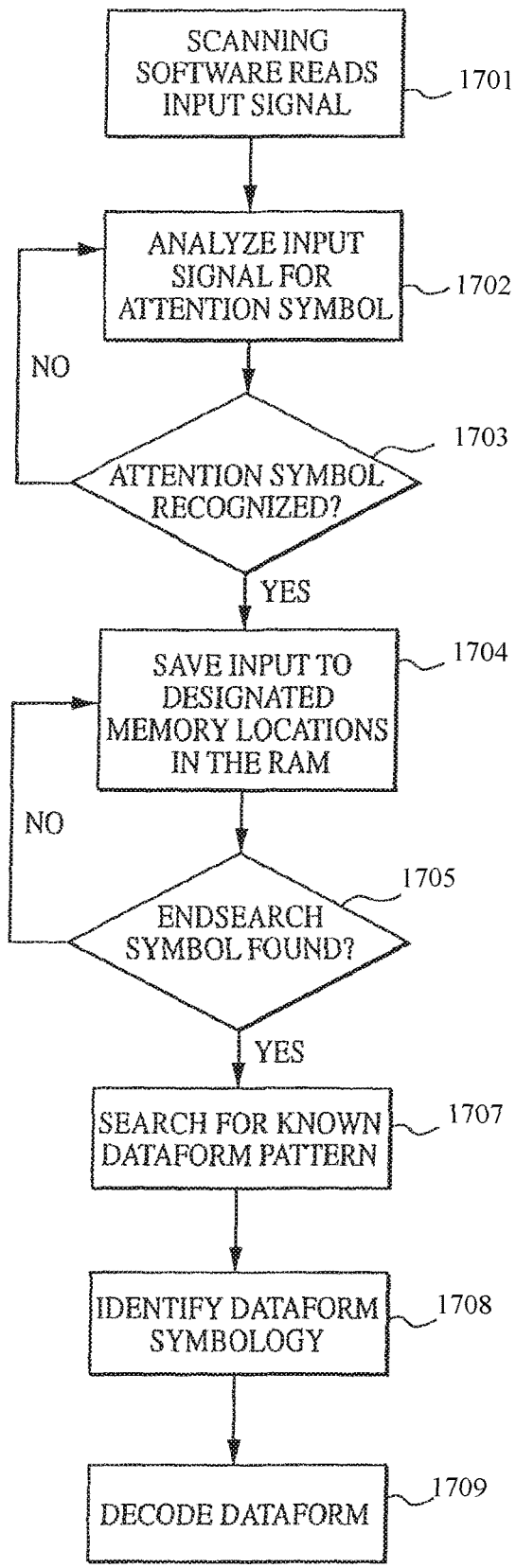
FIG. 17 is a logical flow chart illustrating one embodiment of the method of recognizing the "attention" and "endsearch" symbols printed on the receipt of FIG. 13.

FIG. 17 is a flow chart illustrating the scanning device's operation in conjunction with the attention and endsearch symbols. Software executed on a microprocessor in the scanning device reads the input scanning signal (step 1701). The software analyzes the input signal for the signature of the attention symbol (step 1702) until it recognizes the attention symbol (step 1703). On finding the attention symbol, the scanned imagery that follows is saved to designated memory locations in the RAM (step 1704) and the software begins searching for the endsearch symbol (step 1705). On finding the endsearch symbol (step 1706), the software examines the imagery saved in the designated memory locations in RAM and assembles the dataform contained in the signals stored therein (step 1707). Once the entire symbol is assembled, the software analyzes the image to identify the dataform symbology and the appropriate decoding algorithm (step 1708). The software then uses the algorithm to decode the dataform (step 1709).

As previously described, the mapping of the transaction data corresponds to the characterizations made by the vendor and/or the purchaser so that, for example, the numerical data representing the total price of the transaction is recognized by the purchaser's database as the value reflecting the total price of the transaction. So stored, the transaction data can be accessed by various software applications. Among other functionality, such software applications further allow the purchaser to "hand key" the handwritten notations he or she previously made on the receipts into the computer. Three exemplars of software that would access the transaction data stored on the purchaser's computer are spreadsheet software, formatting/translation software for exporting the transaction data for processing by other software, and report generation software for creating human readable expense reports for corporate expense reporting uses. However, one skilled in the art can readily see that any software application designed or adapted to access data so stored could be employed to access and utilize the transaction data.

In another embodiment of the invention, the scanning device scans and stores the entire receipt 1109 as a single image (the "Receipt Image"). Through recognition of unique identifier symbols (e.g., the "attention" and "endsearch" symbols described above) the dataform pattern 1108 is identified as one component of the scanned image and is decoded and processed as described above. The Receipt Image is retained as a discrete file, within the system, and is marked with an indexing identifier relating it to the characterized transaction data that was decoded from the dataform on the Receipt Image and stored. So stored, the Receipt Image can be subsequently accessed by various software applications or transmitted as required.

Figure 18:
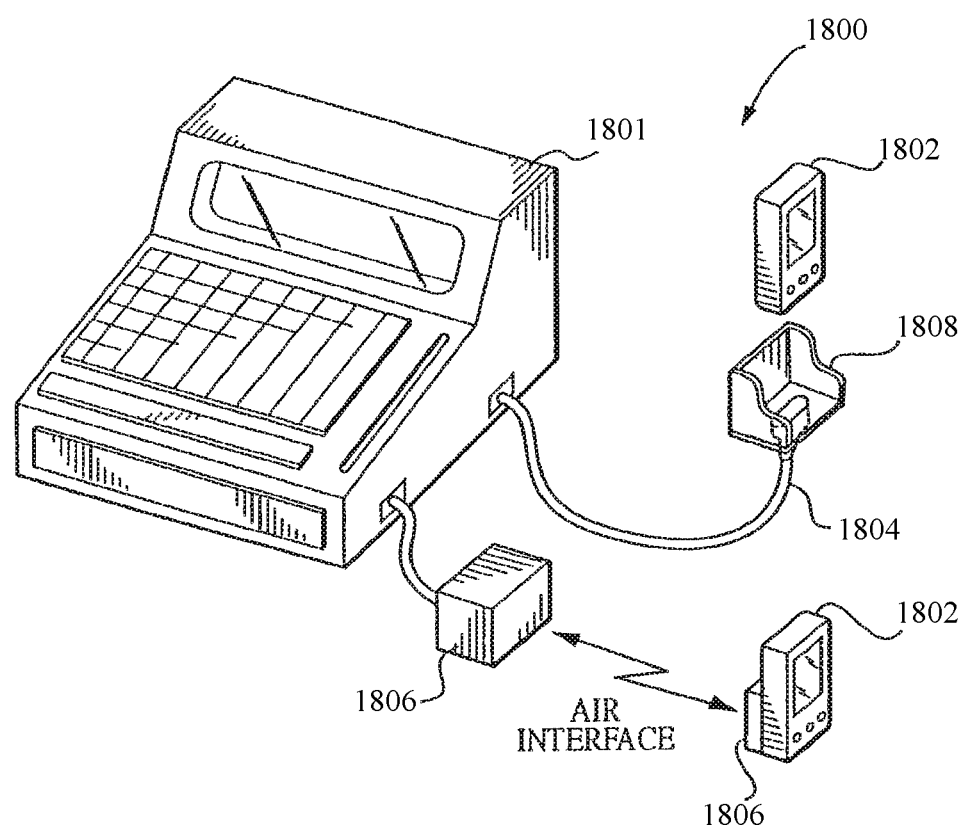
FIG. 18 is a perspective view illustrating a second embodiment of the transaction encoding and decoding system of the present invention, including a wireless interface to a personal digital assistant (PDA) or other data processing device.

In yet another embodiment of the invention 1800 (shown in FIG. 18), the cash register 1801 employs a wired (i.e., direct cable connection) 1804 or wireless transmission interface 1806 to transmit vendor entered transaction data from the cash register 1801 to a customer's data processing device (e.g., PDA) 1802 for subsequent use or transfer. In the wired connection option, a cradle, 1808 or other device for receiving the PDA is used. Cable based wired transfer methods, such as that specified for RS-232 connections, are well understood in the industry, and accordingly are not described further herein. A number of different wireless transmission methodologies (air interfaces) may be employed to transfer transaction data from the cash register to a PDA or other data processing device including, inter alia, point to point transmission via the Infrared Data Association's ("IrDA") infrared based wireless transmission standard; wireless radio frequency ("RF") based local area network ("LAN") connections based on the IEEE 802.11 LAN access standard (including both frequency-hopping and direct sequence spread spectrum variants); the "Bluetooth" 2.45 GHz frequency band based wireless communication specification, both passive and active radio frequency identification technology (collectively "RFID"), and the Home RF Shared Wireless Access Protocol. The construction and operation of each of these air interfaces is well known in the communications arts, and accordingly is not described further herein.

After creating a transaction dataset comprising the transaction-related data previously described with respect to FIG. 9, the cash register 1801 converts the transaction dataset into an appropriate transfer format via software resident on the cash register, and transmits the dataset to the PDA, which is equipped to receive the transmission in the specified protocol. The dataset is then stored in RAM of the PDA, or another storage device associated therewith. At some later time, the purchaser uses custom developed synchronization software or software based on commercially available database synchronization utilities to map the characterized transaction dataset with the PDA's RAM or storage device to a designated database or databases on the purchaser's personal computer (PC) 1805 or another data processing device. Examples of commercially available synchronization software of the typed referenced herein include, but are not limited to, IntelliSync™ manufactured by Puma Technology, and PocketMirror™ manufactured by Chapura. So stored, the transaction data can be accessed by various software applications on the purchaser's computer and/or transmitted as required. One skilled in the art can readily see that any device communication protocol designed or adapted to access data so stored could be employed to access and transmit the transaction data.

Figure 19:
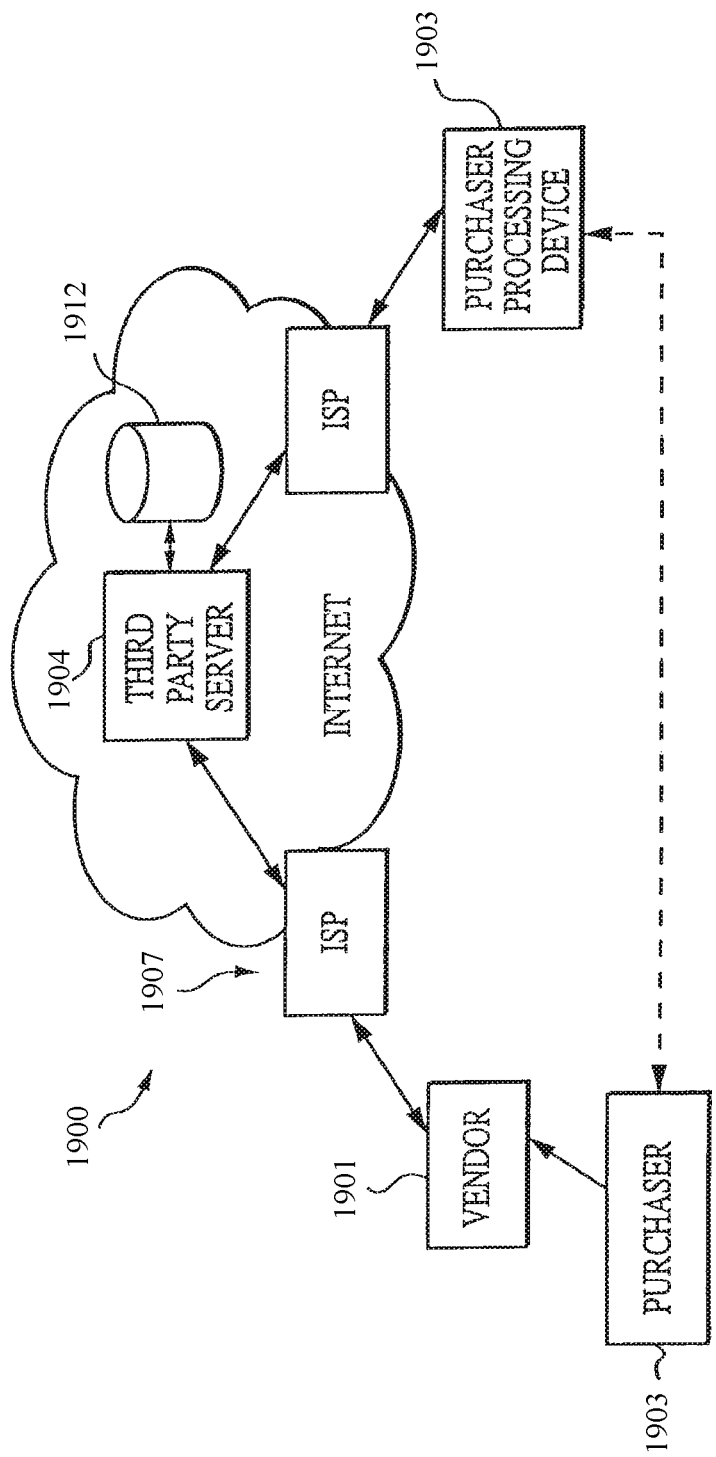
FIG. 19 is a logical block diagram illustrating a third embodiment of the transaction encoding and decoding system of the present invention, including a networked interface to a remote third-party server accessible to both the vendor and purchaser involved in a transaction.

Referring now to FIG. 19, yet another embodiment of the transaction encoding and decoding system of the present invention is disclosed. In the embodiment of FIG. 19, the transaction encoding and decoding system 1900 includes a networked interface 1902 to a remote third-party server 1904 accessible to both the vendor 1901 and purchaser 1903 involved in a transaction. In the illustrated embodiment, the vendor transmits the transaction data to the server 1904 via a standard network connection 1907 such as that provided by an Internet service provider (ISP) using, for example, the well-known TCP/IP or FTP protocols. Such connections may include, for example, the well-known dial-up connection, digital subscriber line (DSL), or DOCSIS (cable modem), although others may be used. Alternatively, the server and vendor may be part of a local area network (LAN), wide-area network (WAN), or intranet. Similarly, the purchaser 1903 may gain access to the server 1904 via similar network connections. The server 1904 of the present embodiment further includes a secure database 1912 for storing transaction data received from a plurality of vendors and relating to a plurality of different transactions. Such transaction data is advantageously stored based on a transaction identification code or other data, and may be password protected and/or encrypted using public-key or other types of encryption to further thwart surreptitious access. Similarly, one or more of the network connections 907 may comprise a virtual private network (VPN) which creates a secure "tunnel" across public networks such as the Internet.

Figure 20:
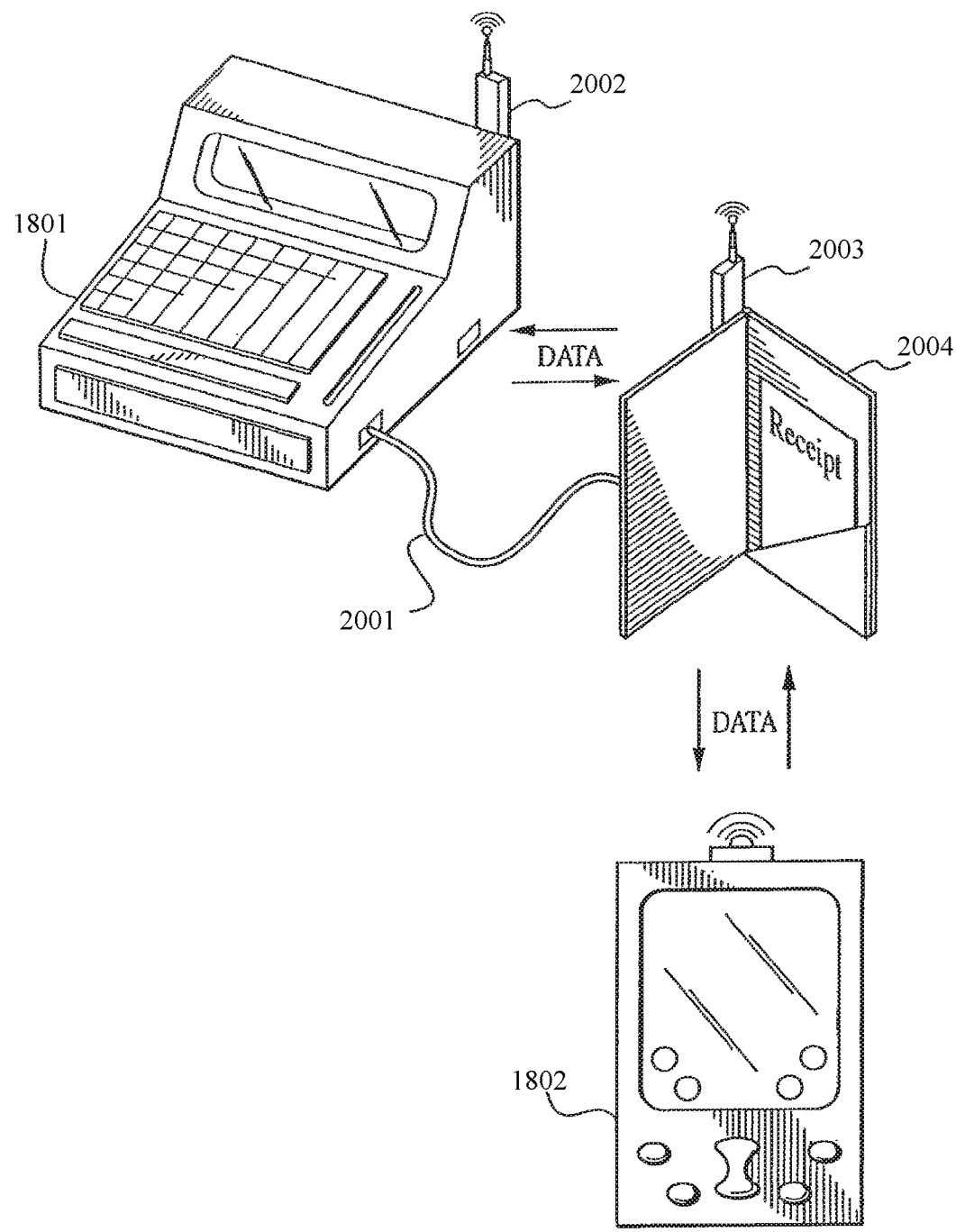
FIG. 20 is a perspective view illustrating a fourth embodiment of the transaction encoding and decoding system of the invention, including a radio frequency identification (RFID) tag.

Referring now to FIG. 20, in yet another embodiment of the invention, the cash register 2001 employs a wired (i.e., direct cable connection) or wireless transmission method to transmit vendor entered transaction data from the cash register to a small dedicated device. Cable based wired transfer methods, such as that specified for RS-232 connections, are well understood in the industry, and accordingly are not described further herein. In one embodiment the RFID chip. A number of different wireless transmission methodologies (air interfaces) may be employed to transfer transaction data from the cash register to a PDA or other data processing device including, inter alia, point to point transmission via the Infrared Data Association's ("IrDA") infrared based wireless transmission standard; wireless radio frequency ("RF") based local area network ("LAN") connections based on the IEEE 802.11 LAN access standard (including both frequency-hopping and direct sequence spread spectrum variants); the "Bluetooth" 2.45 GHz frequency band based wireless communication specification and the Home RF Shared Wireless Access Protocol. The construction and operation of each of these air interfaces is well known in the communications arts, and accordingly is not described further herein.

Referring now to FIG. 20, yet another embodiment of the invention is described. An intermediary transceiver device 2003 is used to convey the transaction data from the cash register 1801 to a PDA or other data processing device 1801 at a location that is remote from the cash register 1801. For example, in the context of a restaurant, the transceiver device 2003 would be used to transfer transaction data from the cash register 1801 to a customer's PDA 1801 without requiring the customer to leave his or her table to go to the cash register 1801. The cash register 1801 employs a wired (i.e., direct cable connection) 2001 or wireless 2002 transmission method to transmit vendor entered transaction data from the cash register 1801 to a small dedicated transceiver and temporary storage device 2003 in a manner substantially similar to that previously described with respect to FIG. 18. As previously stated, a number of different wired and wireless transmission methodologies (air interfaces) may be employed to transfer transaction data from the cash register to a PDA or other data processing device 1802; the construction and operation of each of these air interfaces is well known in the communications arts, and accordingly is not described further herein. In the preferred embodiment, the transceiver (or in the case of RFID an RF Tag) and (depending on the wireless or wired transmission method used) associated ROM, RAM, battery, memory and antenna components (not shown), are embedded in a small folder 1004 similar in appearance and size to the type commonly used by restaurants to hold bills presented to restaurant patrons for payment. At some time after the transaction data is transferred into the transceiver device 2003, the transaction data is again transferred from the transceiver device 2003 to a PDA or other data processing device 1802 in a manner substantially similar to that described in FIG. 18 for transfer of transaction data between the cash register 1801 and a PDA or other data processing device 1802.

Terminology

It will be recognized that while certain aspects of the invention are described in terms of specific design examples, these descriptions are only illustrative of the broader methods of the invention, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

The various illustrative processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, hard disk, a removable disk, a CD-ROM, memory capable of storing firmware, or any other form of computer-readable storage medium known in the art. An exemplary computer-readable storage medium can be coupled to a processor such that the processor can read information from, and write information to, the computer-readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out. Thus, in certain embodiments, not all described acts or events are necessary for the practice of the processes. Moreover, in certain embodiments, acts or events may be performed concurrently, e.g., through multithreaded processing, interrupt processing, or via multiple processors or processor cores, rather than sequentially.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others. The scope should be determined with reference to the claims.

What is claimed is:

1. A method to restrict use of encrypted data, the method comprising:
   storing on a cell phone data indicative of fingerprints of one or more authorized users of the cell phone;
   storing on the cell phone encrypted information;
   transmitting wirelessly with the cell phone the encrypted information stored on the cell phone directly to a first device using one of infrared-based communication and radio frequency-based communication, the first device including at least one computing device comprising computer hardware;
   reading a fingerprint of a user with a fingerprint scanner included on the cell phone;
   generating user fingerprint data indicative of the read fingerprint of the user;
   comparing, with the first device, the user fingerprint data indicative of the read fingerprint of the user with the stored data indicative of the fingerprints of the one or more authorized users of the cell phone in response to transmitting the encrypted information to the first device and generating the user fingerprint data;
   determining, with the first device, that the comparison of the user fingerprint data with the stored data indicative of the fingerprints of the one or more authorized users of the cell phone indicates that the user fingerprint data matches at least one fingerprint in the stored data indicative of fingerprints of the one or more authorized users of the cell phone;
   after said determining that the comparison indicates that the user fingerprint data matches the at least one fingerprint in the stored data, determining, with the first device, that the user is an authorized user of the one or more authorized users of the cell phone;
   after said determining that the user is the authorized user, authorizing, with the first device, use of the encrypted information; and
   receiving wirelessly a confirmation with the cell phone directly from the first device using one of the infrared-based communication and the radio frequency-based communication, the confirmation indicating that the use of the encrypted information has been completed, the confirmation including at least one data structure comprising data associated with the use of the encrypted information.

2. The method of claim 1 further comprising adding a one-way hash algorithm identifier to the confirmation.

3. The method of claim 2 further comprising applying the one-way hash algorithm to the confirmation.

4. The method of claim 3 further comprising encrypting the hashed confirmation with a key to provide an encrypted record.

5. The method of claim 4 further comprising attaching the encrypted record to the confirmation to create a consolidated information file.

6. The method of claim 5 further comprising storing in the cell phone the consolidated information file.

* * * * *